(12) United States Patent
Swinderman et al.

(10) Patent No.: US 7,740,127 B2
(45) Date of Patent: Jun. 22, 2010

(54) BULK MATERIAL HANDLING SYSTEM

(75) Inventors: R. Todd Swinderman, Palm Coast, FL (US); Cristian Vava, North Wales, PA (US)

(73) Assignee: Martin Engineering Company, Neponset, IL (US)

( * ) Notice: Subject to any disclaimer, the term of this patent is extended or adjusted under 35 U.S.C. 154(b) by 0 days.

(21) Appl. No.: 12/327,442

(22) Filed: Dec. 3, 2008

(65) Prior Publication Data

US 2009/0078539 A1    Mar. 26, 2009

Related U.S. Application Data

(62) Division of application No. 11/839,130, filed on Aug. 15, 2007, now Pat. No. 7,556,140.

(60) Provisional application No. 60/824,103, filed on Aug. 31, 2006, provisional application No. 60/885,084, filed on Jan. 16, 2007.

(51) Int. Cl.
B65G 45/16    (2006.01)
(52) U.S. Cl. .................................... 198/499
(58) Field of Classification Search ................ 198/497, 198/499
See application file for complete search history.

(56) References Cited

U.S. PATENT DOCUMENTS

| 2,794,540 | A | 6/1957 | Sinden |
| 3,696,584 | A | 10/1972 | Rickard |
| 4,182,444 | A | 1/1980 | Fisher |
| 4,189,046 | A | 2/1980 | Ward et al. |
| 4,512,705 | A | 4/1985 | Gutsch |
| 4,633,999 | A | 1/1987 | Perneczky |
| 4,696,389 | A | 9/1987 | Schwarze et al. |
| 4,768,645 | A | 9/1988 | Farris |
| 4,825,997 | A | 5/1989 | Bowman et al. |
| 4,854,443 | A | 8/1989 | Gordon |

(Continued)

FOREIGN PATENT DOCUMENTS

DE        4241665        6/1994

(Continued)

OTHER PUBLICATIONS

G. Lodewijks and C.R.J. Versteegh, Implementing Automatic Condition Monitoring Techniques on Belt Scraper Systems, Bulk Solids Handling, 2006, pp. 252-257, vol. 26.

*Primary Examiner*—James R Bidwell
(74) *Attorney, Agent, or Firm*—Thompson Coburn LLP; Clyde L. Smith

(57) ABSTRACT

A bulk material handling accessory such as a conveyor belt cleaner for use in connection with a bulk material handling system. The bulk material handling accessory includes a main frame, a scraping member including an arm and a scraper blade pivotally attached to the main frame, and a damper mechanism coupled at one end to the main frame and at another end to the scraping member. A mounting mechanism is attached to the main frame for providing linear and rotational movement of the main frame and the associated scraping member and damper mechanism. The damper mechanism includes a damper having a piston and a housing having a fluid chamber. The viscosity of the fluid within the fluid chamber is selectively changeable to change the damping characteristics of the damper mechanism to accommodate changes in operating conditions.

5 Claims, 22 Drawing Sheets

U.S. PATENT DOCUMENTS

| | | | |
|---|---|---|---|
| 4,887,329 A | 12/1989 | Perneczky | |
| 4,887,699 A | 12/1989 | Ivers et al. | |
| 4,888,200 A * | 12/1989 | Milliken | 198/499 |
| 4,917,231 A | 4/1990 | Swinderman | |
| 4,936,425 A | 6/1990 | Boone et al. | |
| 5,227,281 A | 7/1993 | Gaschler et al. | |
| 5,248,026 A | 9/1993 | Morefield | |
| 5,276,622 A | 1/1994 | Miller et al. | |
| 5,276,623 A | 1/1994 | Wolfe | |
| 5,277,281 A | 1/1994 | Carlson et al. | |
| 5,278,620 A | 1/1994 | Godlove | |
| D347,918 S | 6/1994 | Gibbs | |
| 5,351,802 A | 10/1994 | Wilson | |
| 5,477,117 A | 12/1995 | Saito et al. | |
| 5,622,249 A | 4/1997 | Morin et al. | |
| 5,652,704 A | 7/1997 | Catanzarite | |
| 5,683,615 A | 11/1997 | Munoz | |
| 5,705,085 A | 1/1998 | Munoz et al. | |
| 5,712,783 A | 1/1998 | Catanzarite | |
| 5,850,906 A | 12/1998 | Dean | |
| 5,878,851 A | 3/1999 | Carlson et al. | |
| 5,900,184 A | 5/1999 | Weiss et al. | |
| 5,950,803 A | 9/1999 | Schwarze et al. | |
| 5,964,455 A | 10/1999 | Catanzarite et al. | |
| 6,027,664 A | 2/2000 | Weiss et al. | |
| 6,041,913 A | 3/2000 | Dolan | |
| 6,076,656 A | 6/2000 | Mat | |
| 6,103,110 A | 8/2000 | Frommann et al. | |
| 6,135,171 A | 10/2000 | Weakly et al. | |
| 6,152,290 A | 11/2000 | Mott et al. | |
| 6,227,350 B1 * | 5/2001 | Yoshizako et al. | 198/499 |
| 6,308,822 B1 | 10/2001 | Moran et al. | |
| 6,311,110 B1 | 10/2001 | Ivers et al. | |
| 6,321,900 B1 | 11/2001 | Micklethwaite | |
| 6,321,901 B1 | 11/2001 | Strebel et al. | |
| 6,374,990 B1 | 4/2002 | Swinderman | |
| 6,374,991 B1 | 4/2002 | Swinderman | |
| 6,382,604 B2 | 5/2002 | St. Clair | |
| 6,424,894 B2 | 7/2002 | St. Clair | |
| 6,439,373 B1 | 8/2002 | Swinderman | |
| 6,446,298 B1 | 9/2002 | Berg, Jr. et al. | |
| 6,513,799 B2 | 2/2003 | St.Clair | |
| 6,575,292 B2 | 6/2003 | Swinderman | |
| 6,581,754 B2 | 6/2003 | Law et al. | |
| 6,591,969 B2 | 7/2003 | Swinderman et al. | |
| 6,618,633 B1 | 9/2003 | Gooch et al. | |
| 6,820,734 B1 | 11/2004 | Gilbert et al. | |
| 6,843,363 B2 | 1/2005 | Schwarze et al. | |
| 6,929,112 B2 | 8/2005 | Hall | |
| 6,986,418 B2 | 1/2006 | Swinderman et al. | |
| 7,007,794 B2 | 3/2006 | Waters et al. | |
| 7,093,706 B2 | 8/2006 | DeVries et al. | |
| 7,131,525 B2 | 11/2006 | Swinderman et al. | |
| D543,670 S | 5/2007 | Swinderman | |
| 7,216,756 B2 | 5/2007 | Swinderman | |
| D547,523 S | 7/2007 | Swinderman | |
| 2004/0149544 A1 | 8/2004 | Dal Ferro | |
| 2006/0131135 A1 | 6/2006 | Waters et al. | |
| 2006/0191772 A1 | 8/2006 | Wiggins et al. | |
| 2007/0029169 A1 | 2/2007 | Swinderman et al. | |
| 2007/0034480 A1 | 2/2007 | Swinderman et al. | |

FOREIGN PATENT DOCUMENTS

| | | |
|---|---|---|
| EP | 0094021 | 11/1983 |
| EP | 0382479 | 8/1990 |
| EP | 0644987 | 3/1995 |
| EP | 0850156 | 7/1998 |
| EP | 907843 | 4/1999 |
| EP | 1016805 | 7/2000 |
| JP | 6215416 | 8/1994 |

* cited by examiner

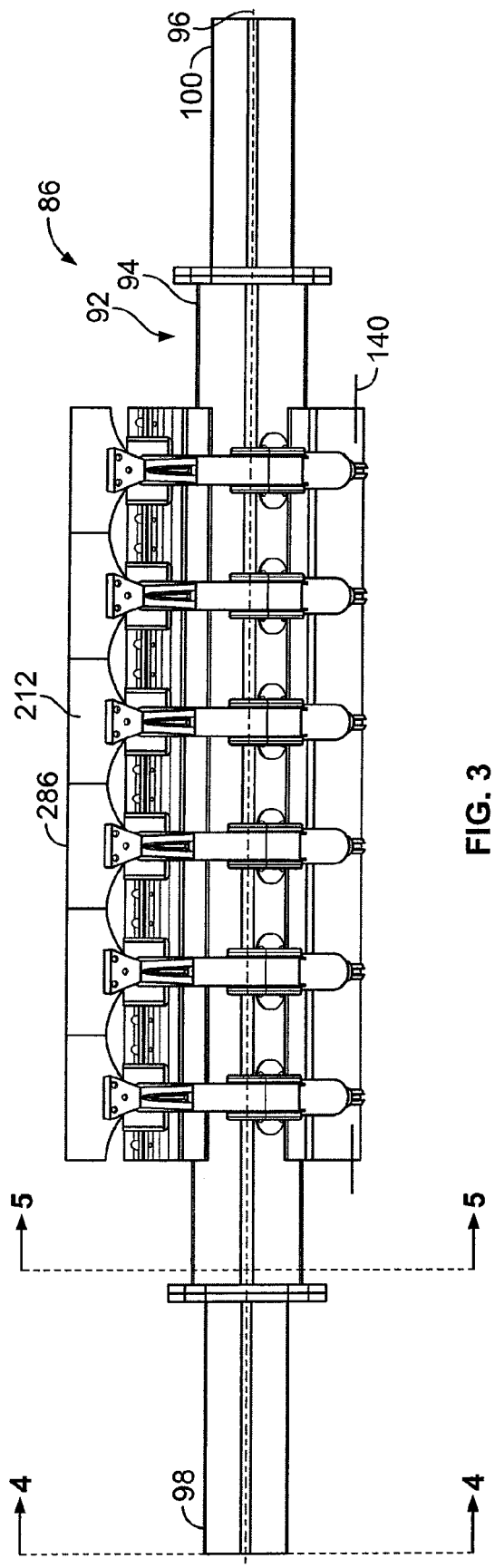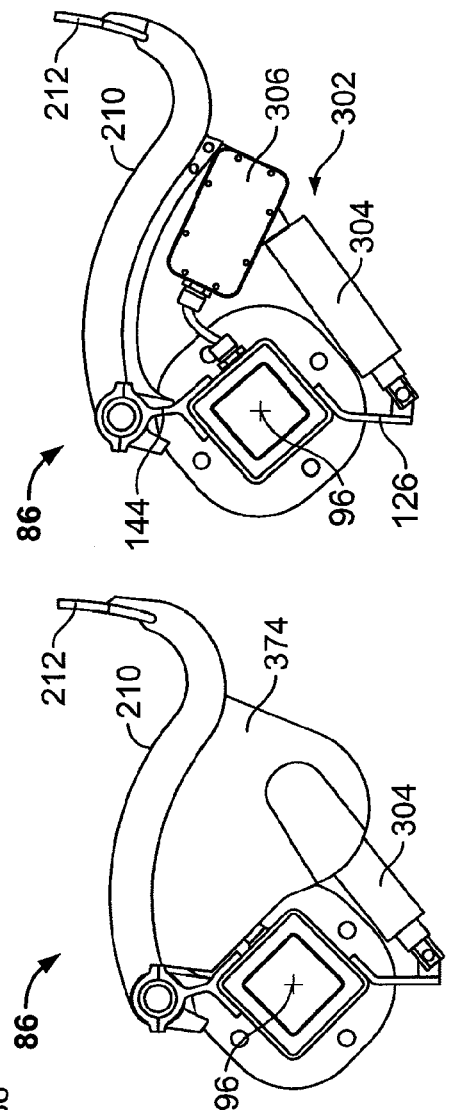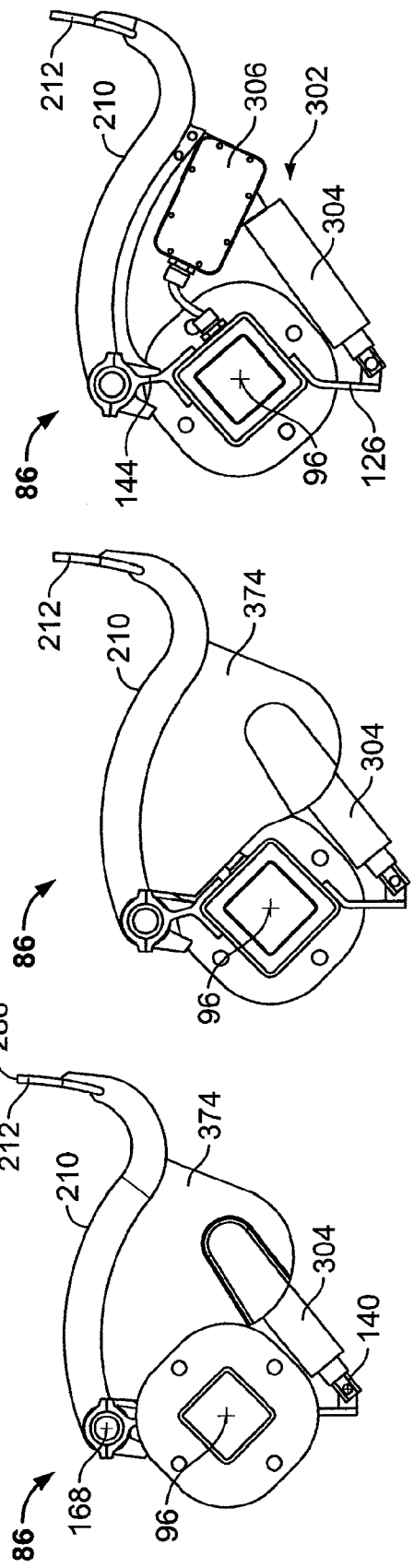

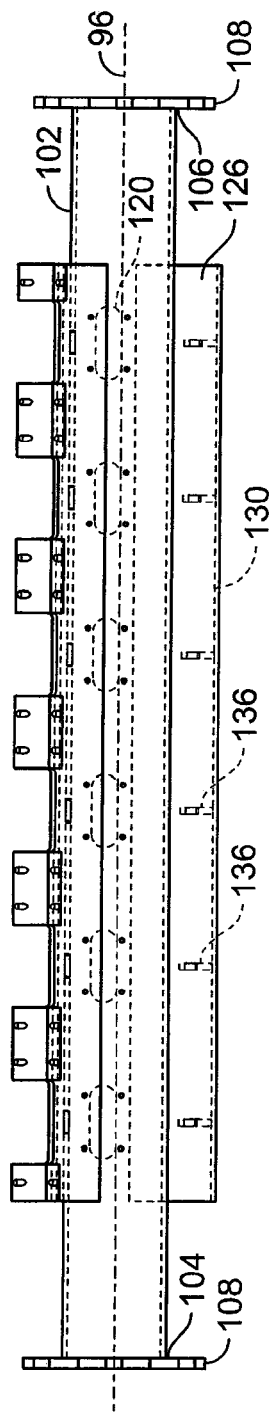
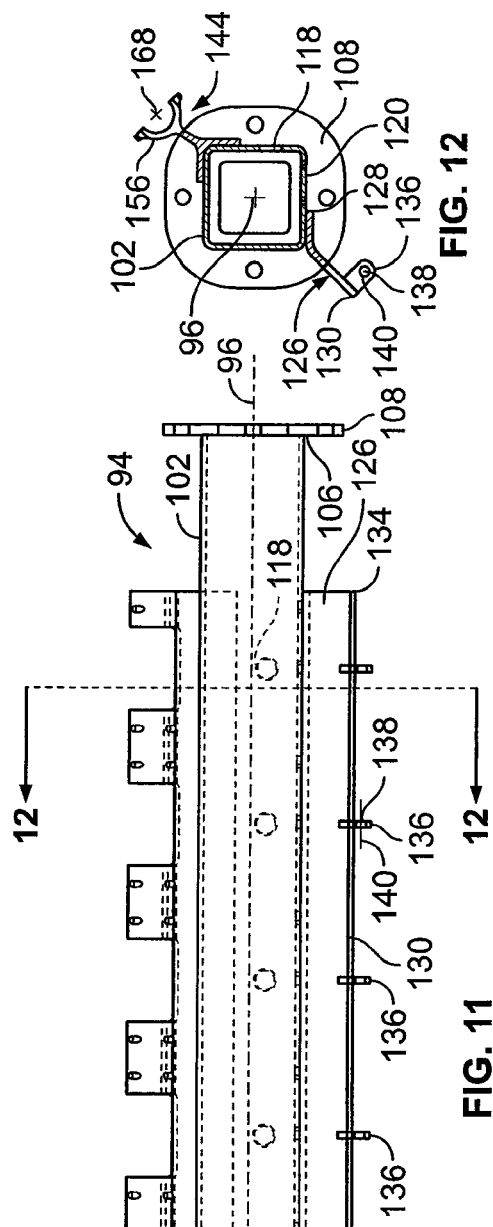
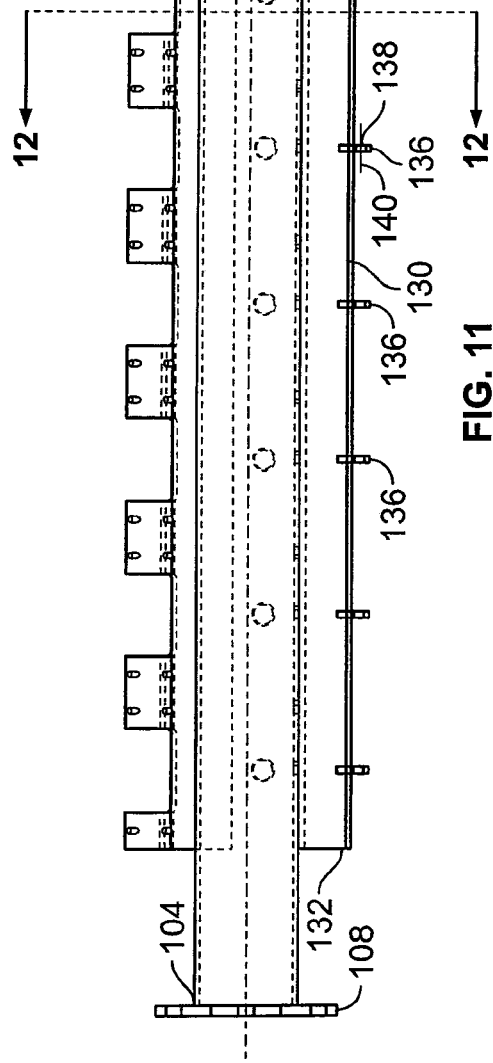

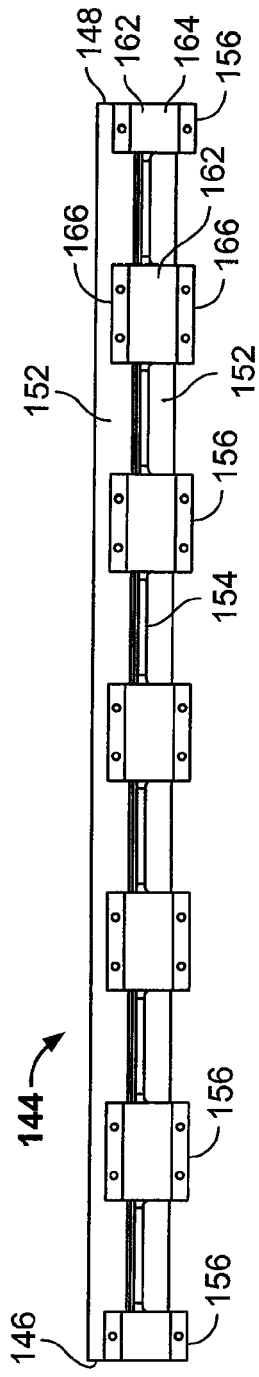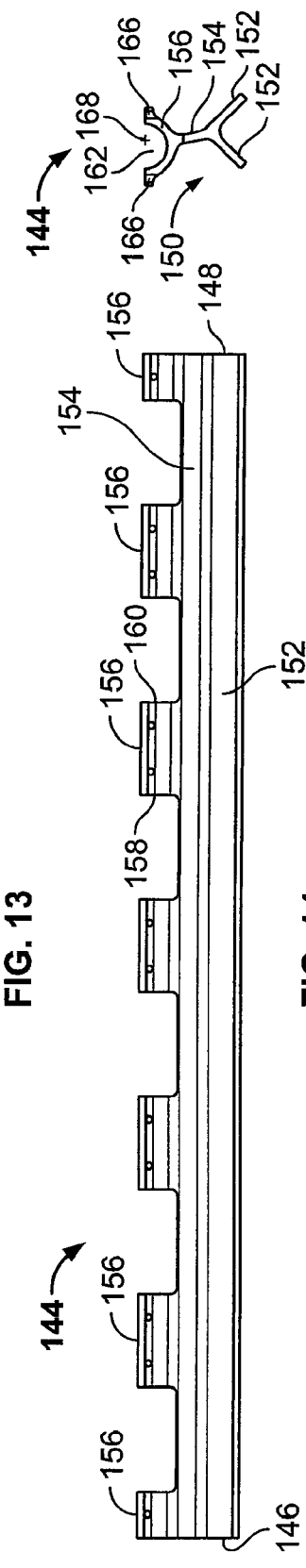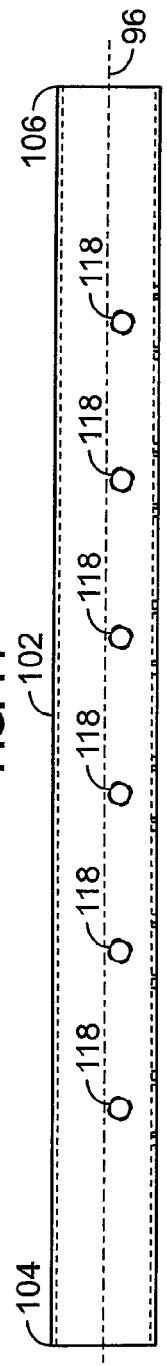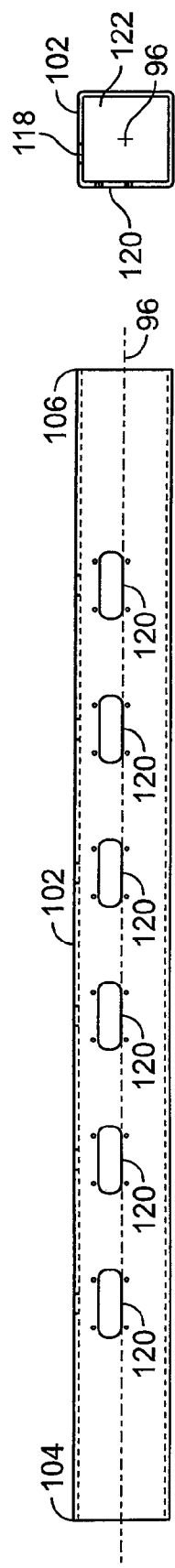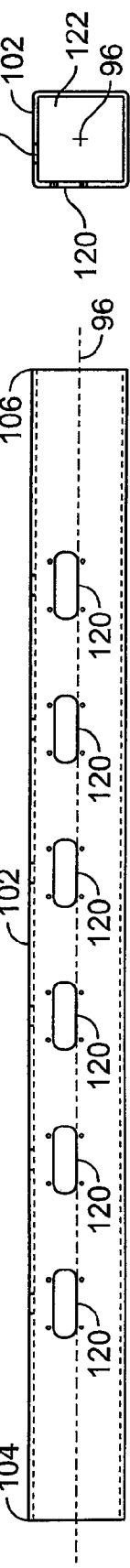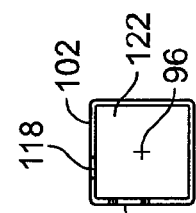

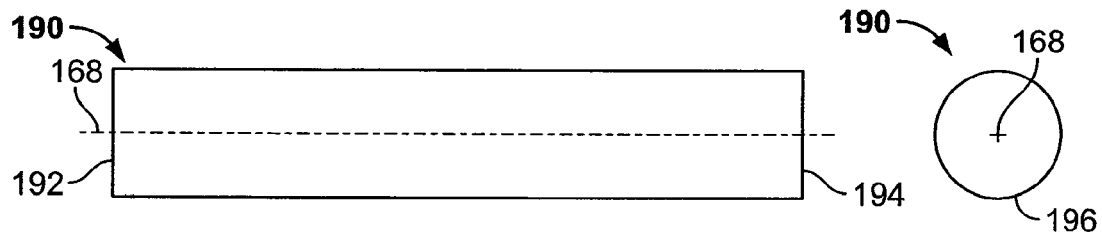
FIG. 19     FIG. 20
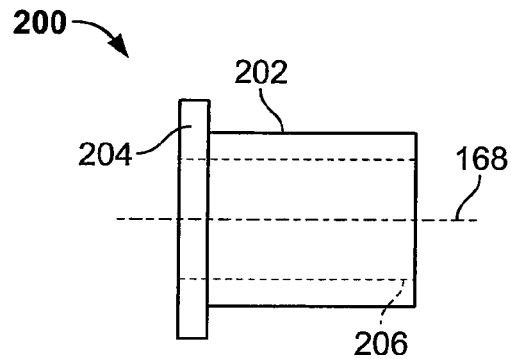     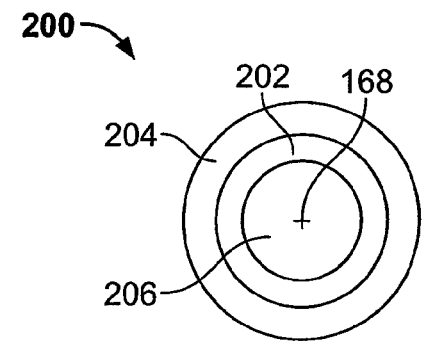
FIG. 21     FIG. 22
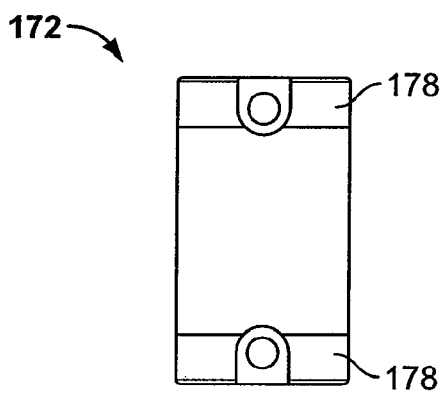     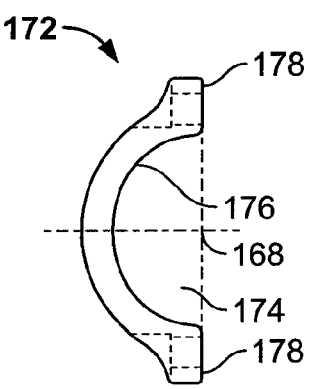
FIG. 23     FIG. 24
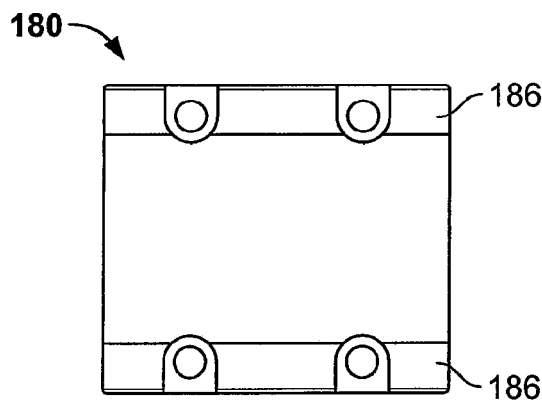     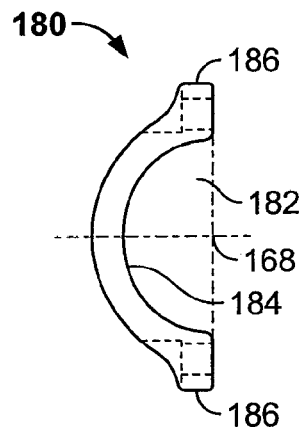
FIG. 25     FIG. 26

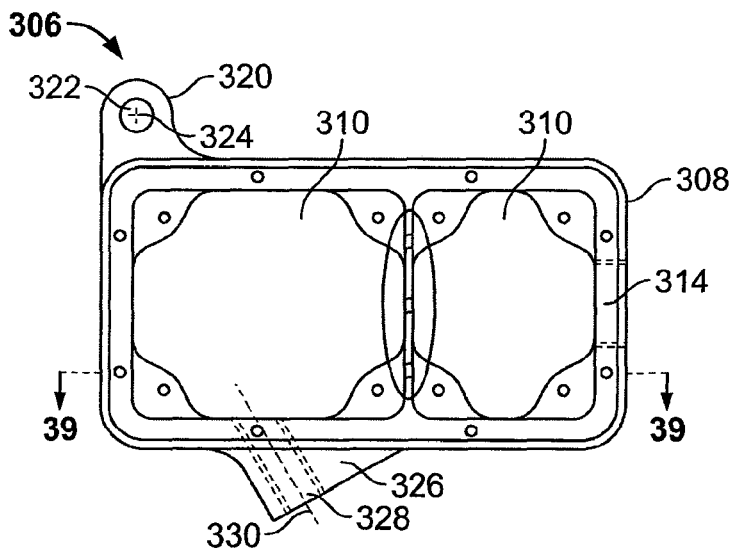
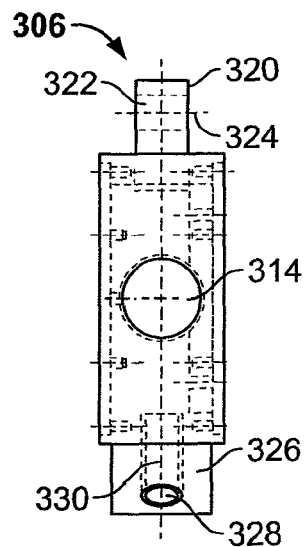
FIG. 37      FIG. 38
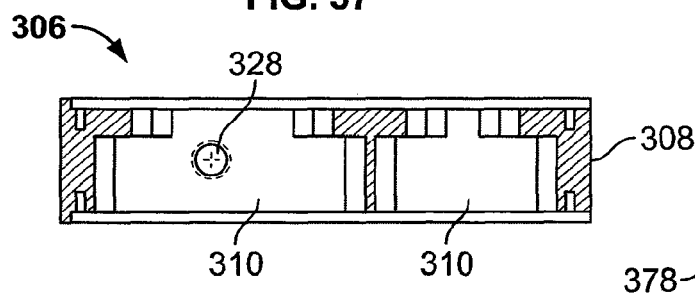
FIG. 39
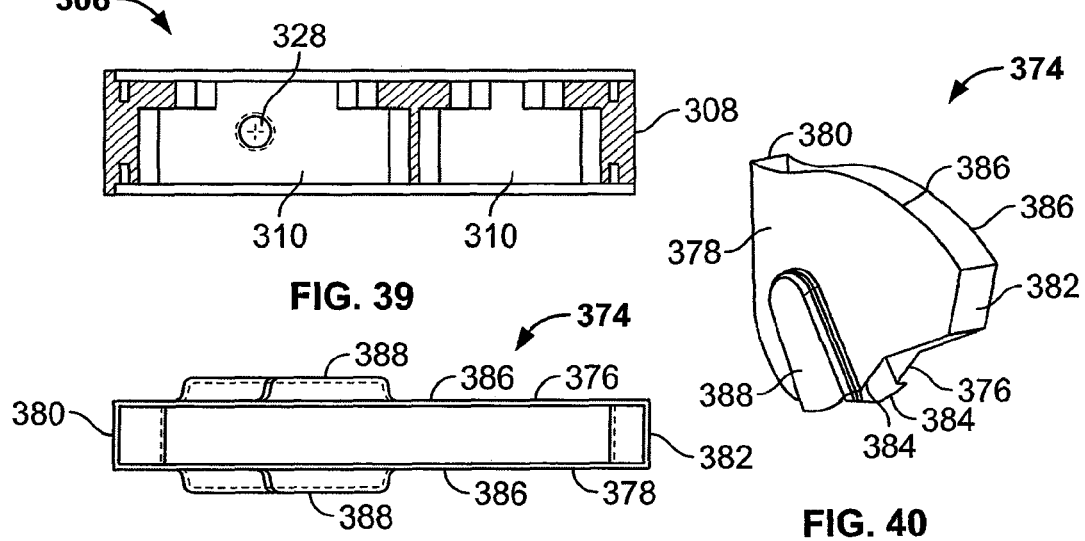
FIG. 40
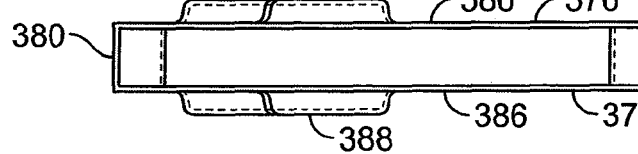
FIG. 41
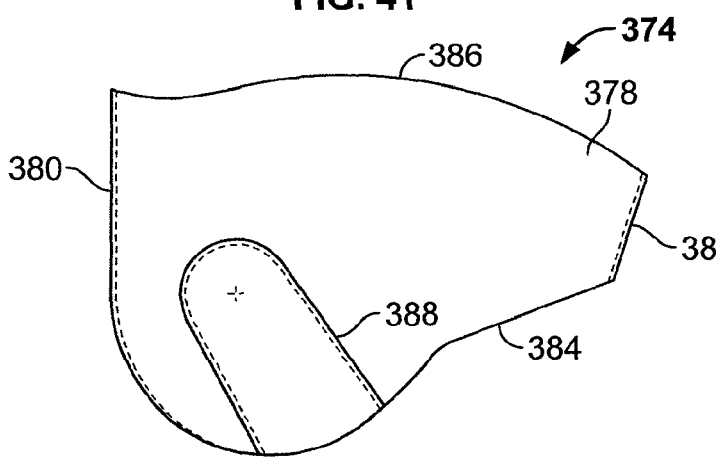
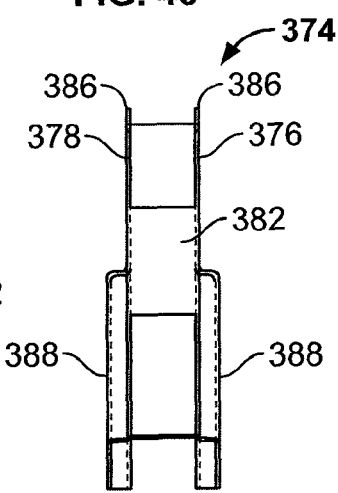
FIG. 42      FIG. 43

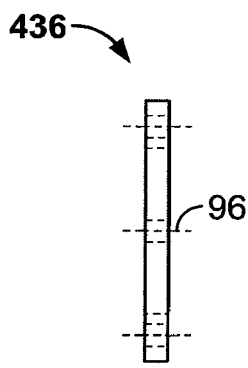
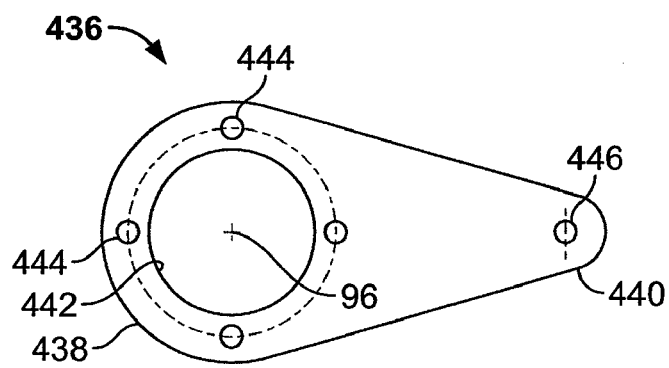
FIG. 50              FIG. 51
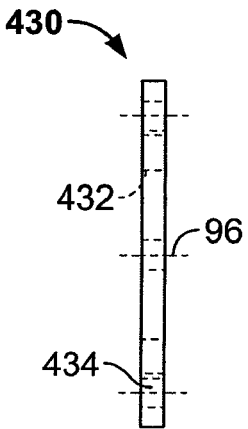
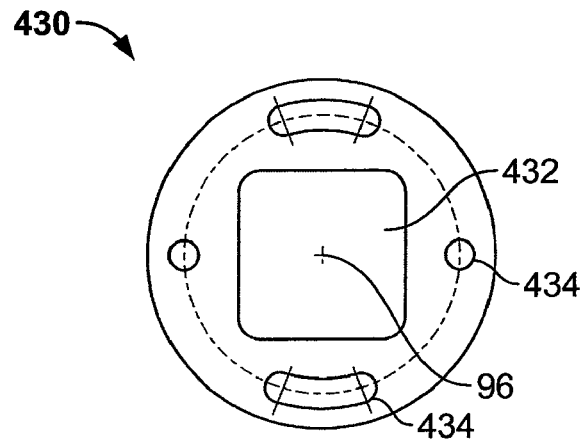
FIG. 52              FIG. 53
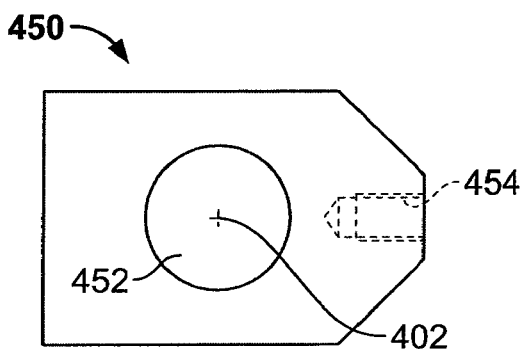
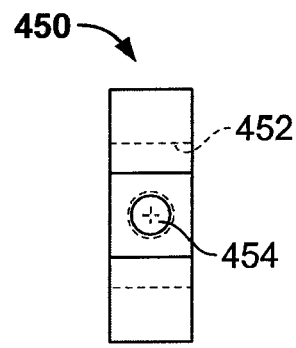
FIG. 54              FIG. 55

BULK MATERIAL HANDLING SYSTEM

RELATED APPLICATIONS

This application is a divisional of U.S. Ser. No. 11/839,130, filed Aug. 15, 2007, now U.S. Pat. No. 7,556,140 which claims the benefit of U.S. Provisional Application No. 60/824,103, filed Aug. 31, 2006, and U.S. Provisional Application No. 60/885,084, filed Jan. 16, 2007.

BACKGROUND

Bulk material handling apparatus are used in connection with the storage and movement of bulk materials such as grain, sand, gravel, coal and the like. Bulk material handling apparatus include primary apparatus and secondary or accessory apparatus. Primary apparatus include conveyors, conveyor transfer points, transfer chutes, bins, silos, hoppers, associated structures and the like. Accessory apparatus include conveyor belt cleaners, air cannons, industrial vibrators, belt tracking devices and the like that are used in combination with primary bulk material handling apparatus. For example, accessory apparatus such as air cannons and industrial vibrators are used in combination with primary apparatus such as transfer points, transfer chutes, bins, silos and hoppers to facilitate and control the flow of bulk material through the primary apparatus and improve the performance of the primary apparatus. Similarly, secondary apparatus such as conveyor belt cleaners are used in combination with primary apparatus such as conveyors to improve the performance of the primary apparatus.

In some cases, such as in the combination of an industrial vibrator with a transfer chute, the accessory apparatus is adapted to create vibrations and to transfer vibrations to the primary apparatus to induce the flow of bulk material through the primary apparatus. In other cases, such as in the combination of a conveyor belt cleaner with a belt conveyor, vibration of the belt cleaner accessory apparatus with respect to the belt conveyor primary apparatus is preferably reduced or eliminated.

Conveyors include an endless belt for moving bulk materials from one location to a second location. As the bulk material is discharged from the conveyor belt, a portion of the bulk material often remains adhered to the belt. Conveyor belt cleaners having one or more scraper blades are used to scrape the adherent material from the belt and thereby clean the belt. The scraper blades of a conveyor belt cleaner are typically attached to a cross shaft that extends transversely across the width of the conveyor belt. The conveyor belt cleaner may include one or more tensioning devices that bias the scraper blades into engagement with the conveyor belt with a force that provides a scraping pressure between the scraper blade and the belt. The scraping edge of each scraper blade wears during use due to its scraping engagement with the moving conveyor belt. Tensioners move the scraper blades as the scraper blades wear to maintain the scraper blades in biased scraping engagement with the conveyor belt.

In order to obtain adequate performance from the conveyor belt cleaner, the scraper blades are biased into scraping engagement with the conveyor belt with a selected amount of force to generate a desired scraping or cleaning pressure between the scraper blade and the belt, and that the scraper blades be disposed at a selected cleaning angle with respect to the belt depending upon operating conditions. If the scraper blades are biased against the conveyor belt with an excessive amount of force, this may result in excessive wear to the scraper blades, may cause damage to the conveyor belt, and may cause the tip of the scraper blade to develop an excessively high temperature due to the friction generated between the scraper blade and the moving conveyor belt. If the scraper blades are biased against the conveyor belt with too small of a force, the scraper blades may not effectively clean the conveyor belt.

In addition, the scraper blades may vibrate or chatter against the conveyor belt, thereby potentially damaging the conveyor belt cleaner and/or the belt, and decreasing cleaning efficiency. Scraper blade chatter may be caused by unevenness of the conveyor belt, such as sagging of the belt, defects in the belt, or splices in the belt, and by frictional forces generated between the scraper blade and the moving belt. Chatter typically decreases as scraping pressure increases. Absent chatter, cleaning efficiency generally increases as scraping pressure increases up to the limit where the belt cover strength is exceeded. Thus, the cleaning angle of the scraper blades and the force at which the scraper blades engage the conveyor belt effect vibration or chatter of the scraper blades against the conveyor belt cleaner as well as the cleaning efficiency.

Moreover, every primary and secondary apparatus has a design mass and therefore a characteristic vibration frequency. The characteristic frequency is affected by rotating or moving components such as the belt, gear boxes, motors plus changes that occur over time with the apparatus such as quantity of bulk material conveyed or stored, wear and corrosion or by unwanted buildup of bulk solids in the form of fugitive materials such as carry back, spillage and dust. Changes in the characteristic frequency of an apparatus can be an indication of a change in its mechanical condition or its operating efficiency.

SUMMARY

A bulk material handling accessory such as a conveyor belt cleaner. The bulk material handling accessory comprises a main frame adapted to be selectively rotatable about a first axis. The main frame comprises a cross shaft, a first mounting member attached to the cross shaft and a second mounting member attached to the cross shaft. The first mounting member may include one or more cradles, with each cradle including a receptacle. A pivot member is adapted to be located in the receptacle of the cradle. A scraping member is coupled to the pivot member such that the scraping member is pivotal with respect to the cross shaft about a second axis. The scraping member includes an arm and a scraper blade adapted to engage a conveyor belt. The arm of the scraping member includes a strut having a first end and a second end. The first end of the strut is adapted to be attached to the cross shaft by the pivot member. The second end of the strut includes a mounting member having a bracket, a retainer member and a slot formed between the bracket and the retainer member adapted to receive the scraper blade.

The bulk material handling apparatus also includes a damper mechanism having a first end coupled to the second mounting member of the main frame and a second end coupled to the scraping member. The damper mechanism is adapted to bias the scraper blade into engagement with the conveyor belt and to dampen vibration of the scraper blade with respect to the conveyor belt. The damper mechanism includes a damper having a first end coupled to the second mounting member and a second end coupled to the scraping member. The damper includes a piston and a housing having a fluid chamber. The piston is movable with respect to the housing in response to movement of the scraper blade. The fluid chamber includes a fluid such as magnetorheological fluid or electrorheological fluid. The viscosity of the fluid in the fluid chamber may be selectively changed to modify the damping characteristics of the damper in response to the operating conditions of the scraper blade by changing a magnetic field or an electric field that is applied to the fluid. The damping characteristics of the damper mechanism may be selectively varied to accommodate changes in operating conditions.

One or more mounting mechanisms may be attached to the main frame. Each mounting mechanism includes a linear positioning mechanism having a first linear actuator and a support bracket, and a rotational positioning mechanism including a pivot arm and a second linear actuator. The support bracket couples the first linear actuator to the cross shaft. The first linear actuator is adapted to selectively move the support bracket and the cross shaft along a generally linear translational axis. The pivot arm is attached to the cross shaft to the main frame and to the second linear actuator, such that the second linear actuator is adapted to selectively pivot the cross shaft about the first axis.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 3 is a front elevation view of the cleaner mechanism of the conveyor belt cleaner.

FIG. 4 is a end view taken along line 4-4 of FIG. 3.

FIG. 5 is a cross-sectional view taken along line 5-5 of FIG. 3.

FIG. 6 shows the conveyor belt cleaner as shown in FIG. 5 but with the deflector shroud removed.

FIG. 10 is a top view of the main frame of the conveyor belt cleaner.

FIG. 11 is a rear elevation view of the main frame.

FIG. 12 is a cross sectional view taken along line 12-12 of FIG. 11.

FIG. 13 is a top view of the upper mounting member of the main frame.

FIG. 14 is a front elevation view of the upper mounting member of the main frame.

FIG. 15 is an end view of the upper mounting member of the main frame.

FIG. 16 is a front elevation view of the center shaft of the main frame.

FIG. 17 is a bottom view of the center shaft.

FIG. 18 is an end view of the center shaft.

FIG. 19 is a front elevation view of the pivot shaft.

FIG. 20 is an end view of the pivot shaft.

FIG. 21 is a side elevation view of the pivot bushing.

FIG. 22 is a end view of the pivot bushing.

FIG. 23 is a top view of an end pivot cap.

FIG. 24 is a side elevation view of the end pivot cap.

FIG. 25 is a plan view of a center pivot cap.

FIG. 26 is a side elevation view of the center pivot cap.

FIG. 37 is a side elevation view of the controller box.

FIG. 38 is a rear elevation view of the controller box.

FIG. 39 is a cross sectional view taken along line 39-39 of FIG. 37.

FIG. 40 is a perspective view of the deflector shroud.

FIG. 41 is a top view of the deflector shroud.

FIG. 42 is a side elevation view of the deflector shroud.

FIG. 43 is a rear elevation view of the deflector shroud.

FIG. 50 is an end view of the pivot arm.

FIG. 51 is a side elevation view of the pivot arm.

FIG. 52 is an end view of the adjustment collar,

FIG. 53 is a side elevation view of the adjustment collar.

FIG. 54 is a top plan view of the support bracket for the rotational positioning mechanism.

FIG. 55 is a side elevation view of the support bracket of FIG. 55.

DETAILED DESCRIPTION

The following description describes techniques of controlling accessories for a bulk material handling system. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Bulk Material Handling System

Figure 57:
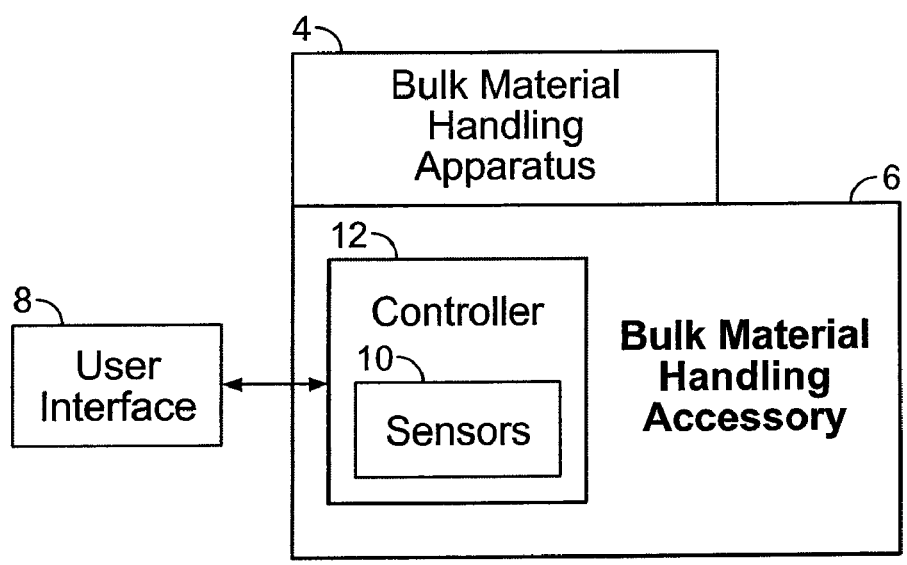
FIG. 57 is a block diagram illustrating a bulk material handling system that may utilize the conveyor belt cleaner depicted in FIGS. 1-56.

Referring now to FIG. 57, a bulk material handling system is depicted. The bulk material handling system may comprise a bulk material handling apparatus 4, a bulk material handling accessory 6, and a user interface 8. The bulk material handling apparatus 4 and bulk material handling accessory 6 may comprise various combinations of bulk material devices. For example, the bulk material handling apparatus 4 may comprise one or more bins and the bulk material handling accessory 6 may comprise one or more air cannons for moving the bulk material through, along or down the bins. Similarly, the bulk material handling apparatus 4 may comprise a chute and the bulk material handling accessory 6 may comprise one or more vibrators for moving the bulk material through, along or down the chute. Further, the bulk material handling apparatus 4 may comprise a bulk material conveyor and the bulk material handling accessory 6 may comprise a cleaner to scrape, peel, or otherwise clean a conveyor belt of the bulk material conveyor. Other combinations of bulk material handling apparatus and bulk material handling accessories are contemplated.

The bulk material handling accessory 6 aids the bulk material handling apparatus 4 in handling bulk material. For example, the bulk material handling accessory 6 may comprise cleaning blades that scrape, peel, or otherwise detach remnants of bulk material from a conveyor belt of the bulk material handling apparatus 4. In such an embodiment, the bulk material handling accessory 6 aids the bulk material handling apparatus 4 by preventing the bulk material from accumulating upon the conveyor belt of the bulk material handling apparatus 4 and potentially obstructing movement of the conveyor belt through the bulk material handling apparatus 4.

The bulk material handling accessory 6 may comprise a controller 12 with sensors 10 for determining characteristic signals that can be related to the operating characteristics of the bulk material handling accessory 6 and/or the bulk material handling apparatus 4. The sensors 10 may comprise motion sensors such as, for example, accelerometers to detect vibrations or other types of movement of the bulk material, the bulk material handling apparatus 4, the bulk material handling accessory 6, and/or a component of either the bulk material handling apparatus 4 or one of its accessories 6. Further, the sensors 10 may comprise temperature sensors such as, for example, infrared sensors to detect or measure temperature of the bulk material, the bulk material handling apparatus 4, the bulk material handling accessory 6, and/or a component of either the bulk material handling apparatus 4 or one of its accessories 6.

The controller 12 of the bulk material handling accessory 6 adjusts the operation of the bulk material handling accessory 6 based upon the signals of the sensors 10. Further, the controller 12 may receive signals from the user interface 8 and may further adjust operation of the bulk material handling accessory 6 based upon the signals received from the user interface 8.

The user interface 8 may comprise various combinations of input/output devices such as, for example, LCD displays, LED displays, CRT monitors, flat panel displays, printers, keyboards, keys, buttons, mice, and the like in order to present information to a user and receive input from a user. As depicted, the user interface 8 is coupled to the controller 12 of the bulk material handling accessory 6. The coupling may be implemented via wired and/or wireless technologies that enable the user interface 8 to be positioned remotely from the bulk material handling accessory such as, for example, an RS-232, an RS-422, or an RS-485 serial interface; an IEEE 802.3 (Ethernet) networking interface; an IEEE 802.11 (WiFi) interface; and other interconnect technologies that permit remote positioning of the user interface 8. Similarly, the coupling may be implemented via wired and/or wireless technologies that enable the user interface 8 to be positioned nearby or locally to bulk material handling accessory such as, for example, Universal Serial Bus (USB) interconnects, IEEE 1394 (FireWire) interconnects, PS/2 mouse and keyboard connectors, IEEE 802.15.1 (Bluetooth) interconnect, and other interconnect technologies that permit local positioning of the user interface 8. While the above associates certain interconnect technologies with "remote" or "local" positioning of the user interface 8, many of the above listed interconnect technologies are capable of supporting both "remote" and "local" user interfaces 40 despite being better suited for one or the other. Further, the above listed interconnect technologies are merely illustrative and some embodiments may utilize interconnect technologies not specifically listed above.

Further details of the bulk material handling system are presented below in regard to an embodiment where the bulk material handling apparatus 4 comprises a bulk material conveyor having a conveyor belt and where the bulk material handling accessory 6 comprises a conveyor belt cleaner with cleaning blades. However, one skilled in the art should appreciate that the following teachings in regard to the conveyor belt cleaner and conveyor belt embodiment are applicable to other embodiments of the bulk material handling system such as a chute with vibrator embodiments and a bin with air cannon embodiments.

Conveyor and Conveyor Belt Cleaner

Figure 1:
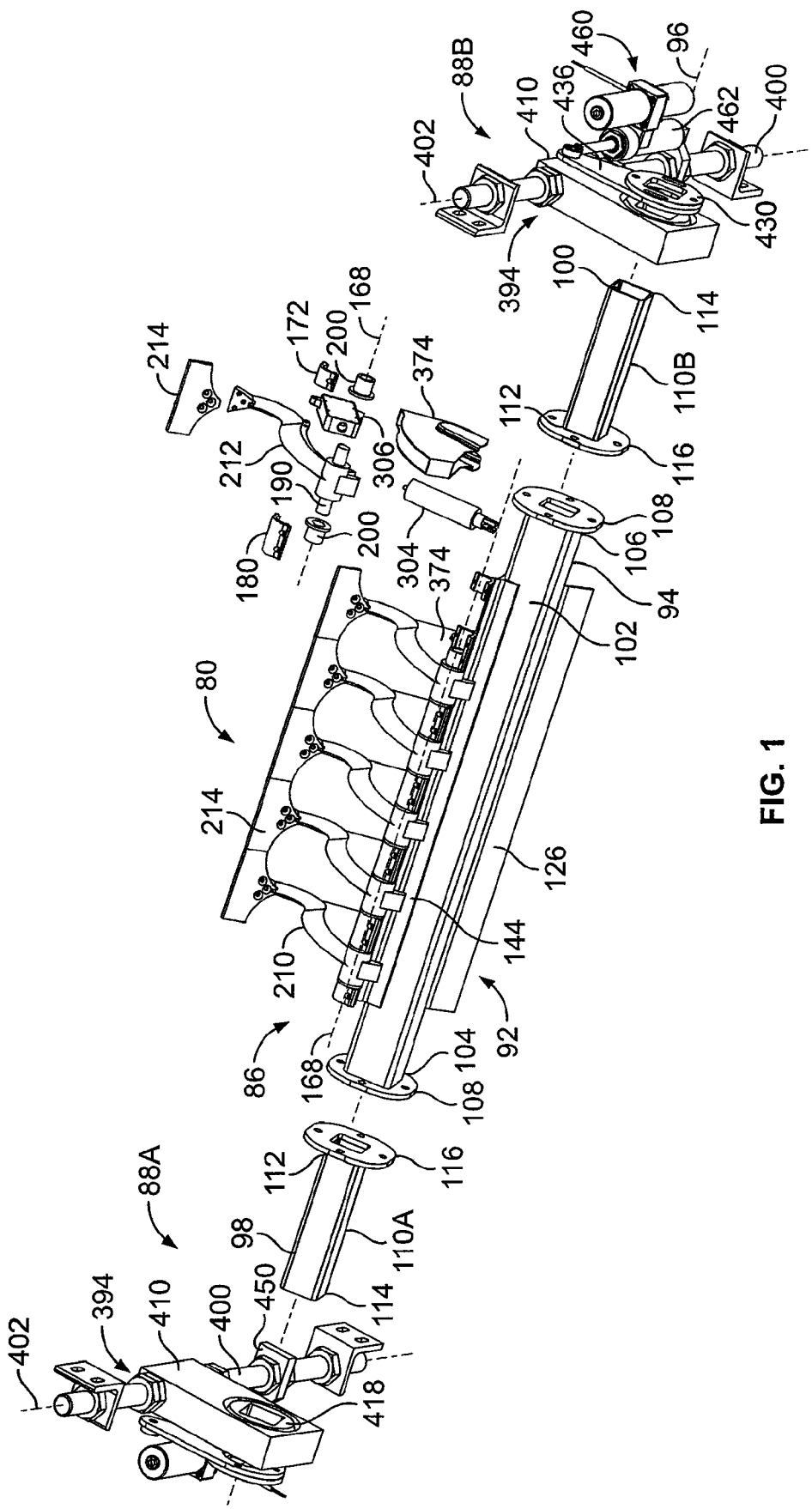
FIG. 1 is a partially exploded view of a conveyor belt cleaner according to the present disclosure.
Figure 2:
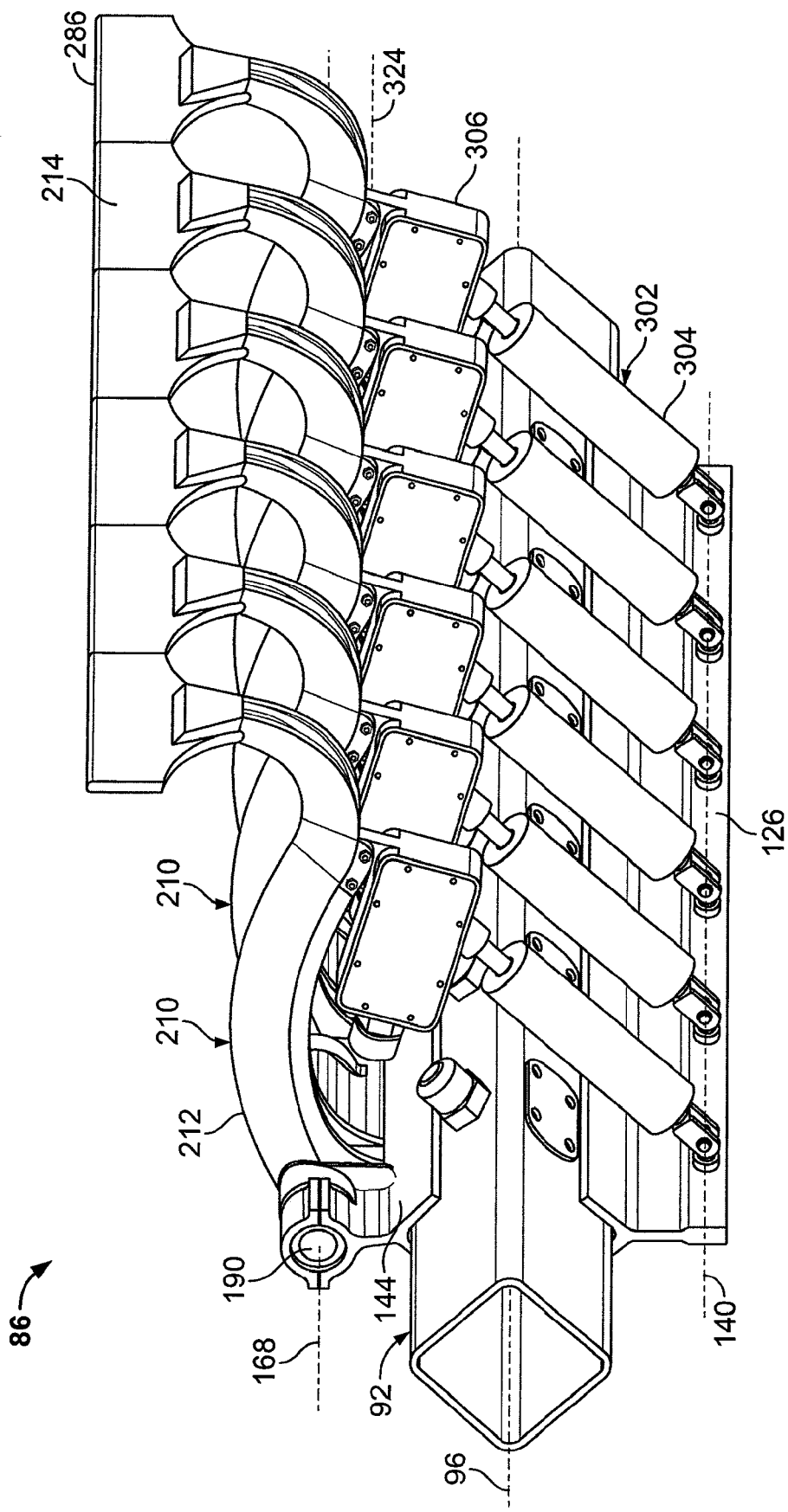
FIG. 2 is a partial perspective view of the conveyor belt cleaner of FIG. 1.
Figure 7:
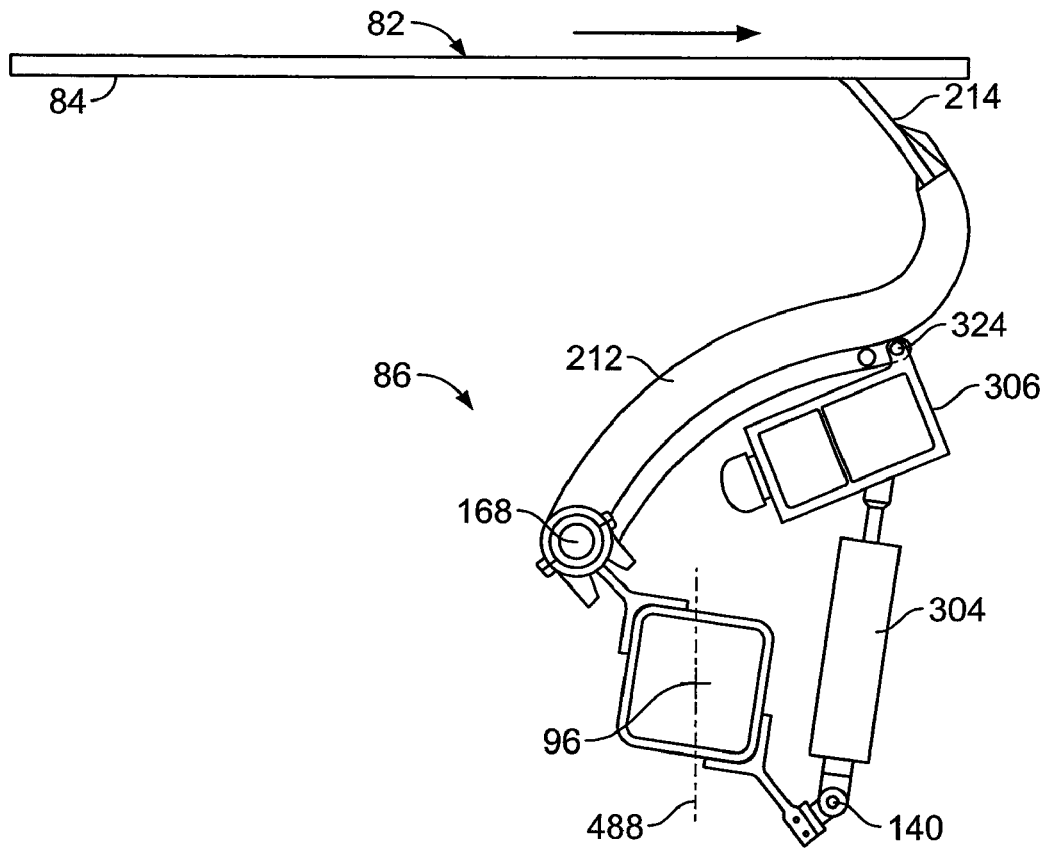
FIG. 7 shows the conveyor belt cleaner with a scraper blade in engagement with the conveyor belt at a positive rake cleaning angle.
Figure 8:
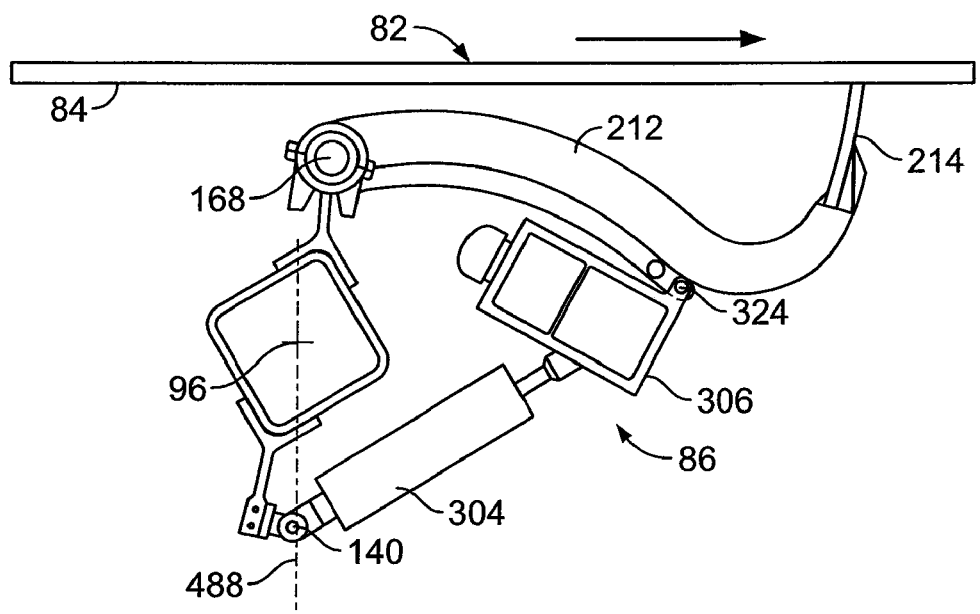
FIG. 8 shows the conveyor belt cleaner with a scraper blade in engagement with the conveyor belt at a negative rake cleaning angle.
Figure 56:
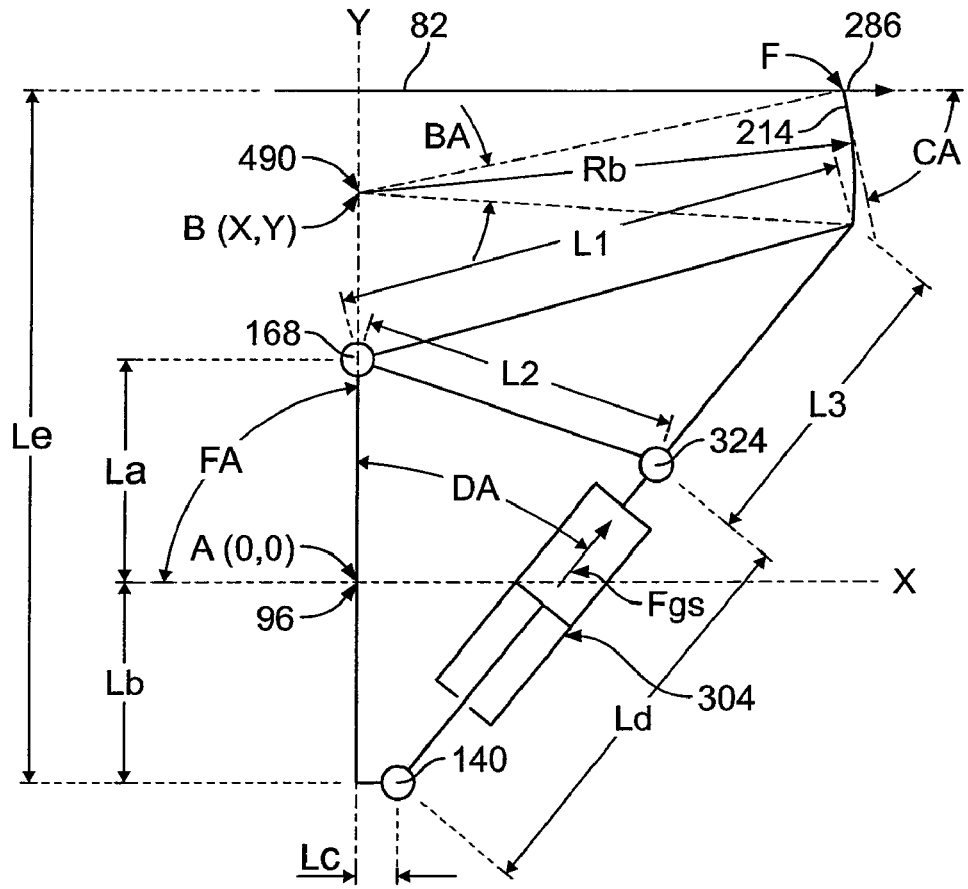
FIG. 56 is a diagram illustrating the geometrical arrangement of the cleaner mechanism.

FIGS. 1-56 depict mechanical aspects of an embodiment of the bulk material handling system where the bulk material handling apparatus 4 comprises a bulk material conveyor 78 comprising a conveyor belt 82 having an outer load carrying surface 84 and where the bulk material handling accessory 6 comprises a conveyor belt cleaner 80. The conveyor belt cleaner 80 may be a secondary conveyor belt cleaner as generally shown in FIGS. 7 and 8 wherein the conveyor belt cleaner 80 is adapted to scrape adherent material from the surface 84 of a portion of the belt 82 that is moving in a generally linear direction as shown by the arrows. The conveyor belt cleaner of the present disclosure may also be used as a primary conveyor belt cleaner adapted to scrape material from the surface 84 of a portion of the belt 82 that is moving in a rotational manner in engagement with the head pulley of the conveyor. Multiple primary and/or secondary conveyor belt cleaners can be used on the same conveyor belt as operating conditions and requirements for cleaning dictate.

The conveyor belt cleaner 80 includes a cleaner mechanism 86 and one or more mounting mechanisms 88A-B. The cleaner mechanism 86 includes a main frame 92 including a cross shaft 94 having a generally linear central longitudinal axis 96. The cross shaft 94 extends generally linearly between a first end 98 and a second end 100. The cross shaft 94 may include a single unitary member, or as shown in FIG. 1 the cross shaft 94 may include a plurality of members or segments. As shown in FIG. 1, the cross shaft 94 includes a center shaft 102 extending between a first end 104 and a second end 106. Mounting members 108, such as generally planar plates, including one or more peripheral apertures are respectively attached to the first end 104 and the second end 106 of the center shaft 102. The cross shaft 94 also includes stub shafts 10A and B. Each stub shaft 110A-B extends between a first end 112 and a second end 114. A respective mounting member 116, such as a generally planar plate, including one or more peripheral apertures is mounted to the first end 112 of each stub shaft 110A and B. The stub shaft 110A is adapted to be removably attached to the first end 104 of the center shaft 102 with fasteners, such as bolts and nuts, that extend through the apertures in the mounting members 108 and 116. The stub shaft 110B is similarly adapted to be removably attached to the second end 106 of the center shaft 102 by fasteners that extend through the apertures in the mounting members 108 and 116. The stub shaft 110A is adapted to be removably mounted to the mounting mechanism 88A, and the stub shaft 110B is adapted to be removably mounted to the mounting mechanism 88B. The center shaft 102 and stub shafts 110A and B may be formed from rectangular or square tubing as shown in FIG. 1, round tubing, solid members, or other structural components.

The center shaft 102 may have a different cross-sectional configuration or size, such as a different width, height, wall thickness and the like, than the stub shafts 110A and B. The stub shafts 110A and B may remain a uniform size to facilitate mounting to the mounting mechanisms 88A-B, while the size of the center shaft 102 may be varied to take into account particular operating conditions such as the width of the conveyor belt and thereby the length of the center shaft 102 between the ends 104 and 106. Consequently, a smaller size center shaft 102 may be used with relatively narrow conveyor belts and a larger size center shaft 102 may be used in connection with wider conveyor belts to minimize deflection and to accommodate increased bending stresses. The connections between the stub shafts 110A-B and the center shaft 102 also enable the center shaft 102 to be removed from the stub shafts 110A and B while the stub shafts 110A-B remain mounted to the mounting mechanisms 88A-B.

As shown in FIGS. 16-18, the center shaft 102 includes one or more generally circular apertures 118 extending through a first wall of the center shaft 102 and that are generally equally spaced apart from one another along the longitudinal length of the center shaft 102 between the ends 104 and 106. The center shaft 102 also includes one or more elongated slot-like apertures 120 that extend through a second side wall of the center shaft 102 and that are generally equally spaced apart from one another along the longitudinal length of the center shaft 102 between the ends 104 and 106. Each aperture 118 is associated with a respective aperture 120, such that each pair of apertures 118 and 120 are located in the same position with respect to one another relative to the length of the center shaft 102 between the ends 104 and 106. The apertures 118 and 120 provide communication with a chamber 122 located within the center shaft 102. Each mounting member 108 and 116 includes a large central aperture such that a hollow passageway extends through the cross shaft 94 from the first end 98 to the second end 100 and that includes the chamber 122.

Figure 9:
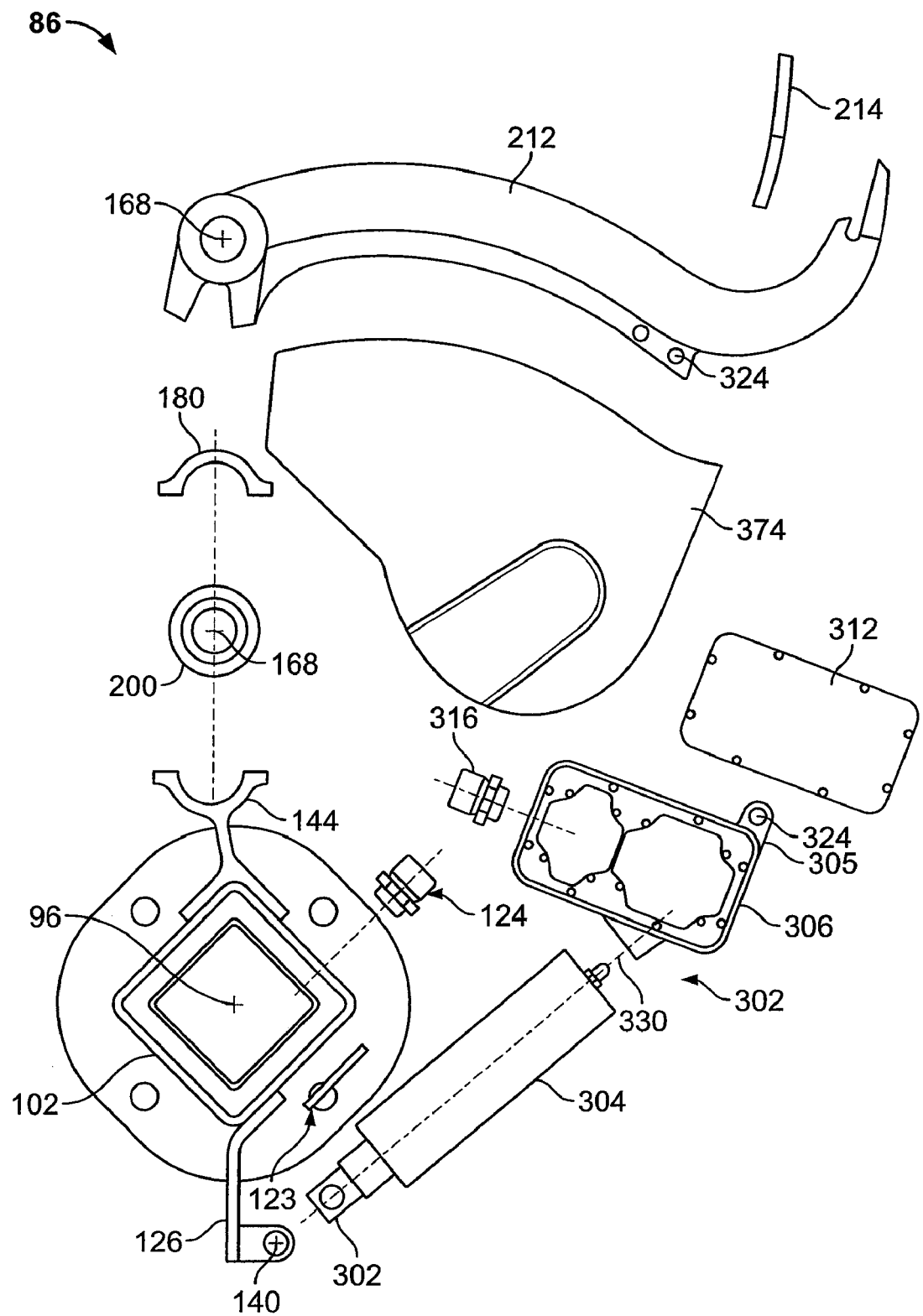
FIG. 9 is an exploded side elevation view of the conveyor belt cleaner.
Figure 27:
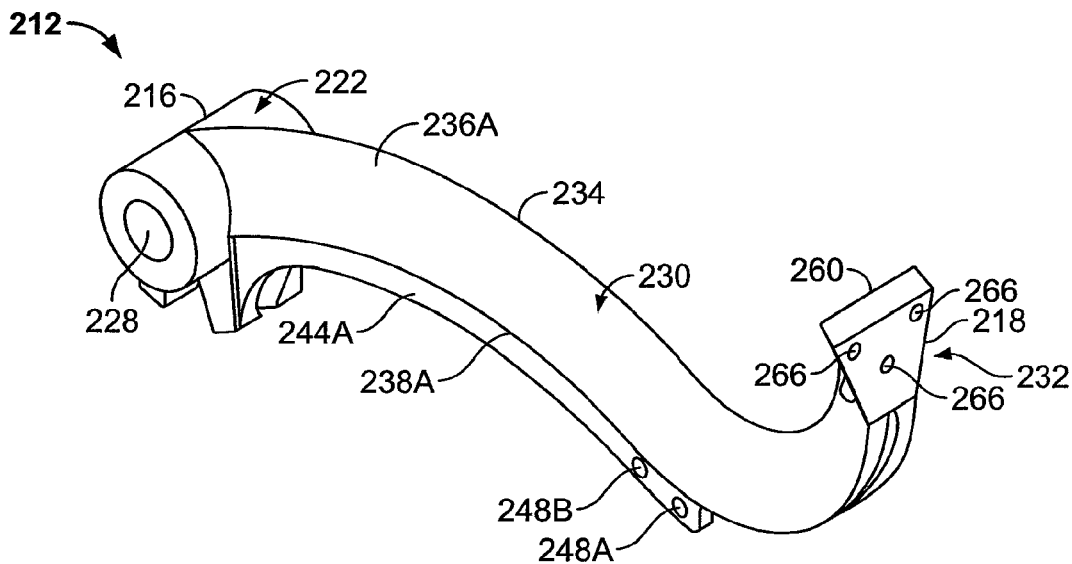
FIG. 27 is a perspective view of the arm of the conveyor belt cleaner.

As shown in FIG. 9, a plurality of cover plates 123 are removably attached to the center shaft 102 such that each cover plate 123 respectively covers a slot-like aperture 120. Each cover plate 123 may be removed from the center shaft 102 to provide access to the chamber 122 within the center shaft 102. A cord grip connector 124 or alternatively a grommet is respectively attached to the center shaft 102 at each aperture 118.

The main frame 92 includes a lower mounting member 126, such as a bent plate, having a first end 128 connected to the wall of the center shaft 102 that includes the slot-like apertures 120 and a second end 130 located radially outwardly from the axis 96 with respect to the first end 128. The lower mounting member 126 also extends longitudinally generally parallel to the axis 96 between a first end 132 and a second end 134. The ends 132 and 134 extend outwardly slightly beyond the locations of the slot-like apertures 120. The lower mounting member 126 includes one or more mounting tabs 136 attached to the second end 130. Each mounting tab 136 includes an aperture 138 that extends through the mounting tab 136 in a direction generally parallel to the axis 196. The mounting tabs 136 are generally uniformly spaced along the length of the lower mounting member 126 between the first end 132 and the second end 134, with each mounting tab 136 in alignment with a respective aperture 118 and slot-like aperture 120. Each of the apertures 138 in the mounting tabs 136 is located generally concentrically about a generally linear axis 140 that extends through each of the apertures 138. The axis 140 is generally parallel to and spaced apart from the axis 96.

The main frame 92 also includes an upper mounting member 144 that extends between a first end 146 and a second end 148 and that is attached to the center shaft 102. The upper mounting member 144 includes a base 150 that is connected to the center shaft 102 generally diametrically from the lower mounting member 126 with respect to the axis 96. The base 150 includes two outwardly extending legs 152 that are generally transverse to one another such that each leg 152 is adapted to be attached to a respective wall of the tube that forms the center shaft 102. The base 150 also includes a stem 154 that extends outwardly from the junction of the legs 152. The base 150 is thereby generally Y-shaped. The stem 154 is offset at an angle with respect to the legs 152 such that the stem 154 is not disposed at an angle midway between the legs 152.

A plurality of cradles 156 are attached to the outer end of the stem 154 and are generally equidistantly spaced apart from one another along the length of the stem 154 between the first end 146 and the second end 148 of the upper mounting member 144. Each cradle 156 extends generally parallel to the base 150 between a first end 158 and a second end 160. Each cradle 156 includes an open-top and open-end receptacle 162 formed by a generally semi-cylindrical interior wall 164. Each cradle 156 also includes a pair of spaced apart and generally parallel flanges 166 that extend from the first end 158 to the second end 160. The top surfaces of the flanges 166 are generally planar and generally coplanar with one another. Each flange 166 includes one or more apertures extending therethrough. The semi-cylindrical wall 164 of the cradle 156 is formed about a generally linear axis 168. As shown in FIGS. 13 and 14, the receptacles 162 located at each end 146 and 148 of the upper mounting member 144 are approximately one-half the length of the receptacles 156 located in the center of the upper mounting member 144 between the end cradles 156. Each flange 166 in the end cradles 156 includes one aperture, whereas each flange 166 in the center cradles 156 includes two apertures. The axis 168 extends generally parallel to the axis 96.

An end cap 172, as shown in FIGS. 23 and 24, is adapted to be removably attached to each end cradle 156 that is located at the ends 146 and 148 of the upper mounting member 144. The end cap 172 includes a open-bottom and open-end receptacle 174 formed by a semi-cylindrical interior wall 176 extending about the axis 168. The end cap 172 includes a pair of spaced apart and generally parallel flanges 178 each of which includes one or more apertures. The bottom surfaces of the flanges 178 are generally coplanar and are adapted to mate with the flanges 166 of the end cradles 156, such that the more receptacle 162 of the cradle 156 and receptacle 174 of the end cap 172 form a generally cylindrical receptacle or bore that extends through the cradle 156 and end cap 172 from the first end 158 to the second end 160 generally concentrically about and along the axis 168. The end caps 172 are removably attached to the end cradles 156 by fasteners such as bolts and nuts.

A center cap 180, as shown in FIGS. 25 and 26, is adapted to be removably attached to each center cradle 156 of the upper mounting member 154. Each center cap 180 includes an open-bottom and open-end receptacle 182 formed by a generally semi-cylindrical interior wall 184 that extends about the axis 168. Each center cap 180 includes a pair of spaced apart and generally parallel flanges 186, each of which includes a plurality of apertures. The bottom surfaces of the flanges 186 are generally coplanar with one another and are adapted to respectively mate with the top surfaces of the flanges 166 of the center cradles 156. Each center cap 180 is adapted to be removably attached to a center cradle 156 by fasteners, such as bolts and nuts, such that the receptacle 182 of the center cap 180 and the receptacle 162 of the center cradle 156 form a generally cylindrical receptacle or bore that extends through the center cradle 156 and center cap 180 from the first end 158 to the second end 160 concentrically about and along the axis 168. The main frame 92, including the cross shaft 94, lower and upper mounting members 126 and 144, the caps 172 and 180, and other components are preferably made from corrosion resistant materials and may be made from metal such as stainless steel.

The cleaner mechanism 86 includes one or more pivot shafts 190. Each pivot shaft 190 extends between and is rotatably mounted to adjacent pairs of cradles 156 of the upper mounting member 144. The pivot shaft 190 is generally cylindrical and extends concentrically about and along the axis 168 from a first end 192 to a second end 194. The pivot shaft 190 includes a generally cylindrical surface 196. The pivot shaft 190 is preferably made from a corrosion resistant material and may be made from metal such as stainless steel.

Each end 192 and 194 of the pivot shaft 190 is adapted to be rotatably mounted to a respective cradle 156 by a bushing 200. The bushing 200 as shown in FIGS. 21 and 22 includes a generally cylindrical sleeve 202 having a generally cylindrical outer surface, and a generally circular collar 204 attached to one end of the sleeve 202. The collar 204 extends outwardly beyond the outer surface of the sleeve 202 thereby forming a generally annular rim. A generally cylindrical bore 206 extends through the sleeve 202 and collar 204 along the axis 168. The bore 206 has a diameter such that the end of the pivot shaft 190 will closely fit within the bore 206 in rotating engagement with the inner wall of the bushing 200 formed by the bore 206. The bushing 200 may be formed from a friction reducing material and may be formed from metal such as oilite bronze.

The sleeve 202 of each bushing 200 is adapted to be located within the receptacle 162 of a cradle 156 and is removably retained therein by clamping engagement with the end cap 172 or center cap 180. The collar 204 of the bushing 200 is positioned adjacent the end of the receptacle 162. The first end 192 of a pivot shaft 190 extends into the bore 206 of a bushing 200 located in a first cradle 156, and the second end 194 of the pivot shaft 190 extends into the bore 206 of a bushing 200 located in an adjacent cradle 156. The pivot shaft 190 thereby extends between a pair of adjacent cradles 156. The pivot shaft 190 is adapted to pivot or rotate about the central axis 168 with respect to the bushings 200 and cradle 156.

The cleaner mechanism 86 also includes one or more scraping members 210. Each scraping member 210 includes an arm 212 and a scraper blade 214. The arm 212 extends between a first end 216 and a second end 218 along a central longitudinal axis 220. The first end 216 includes a generally cylindrical hub 222 that extends generally transversely to the axis 220 between a first end 224 and a second end 226. A generally cylindrical bore 228 extends through the hub 222 from the first end 224 to the second end 226 along and concentrically about the axis 168. The pivot shaft 190 extends through the bore 228 of the hub 222 such that the first end 192 and second end 194 of the pivot shaft 190 each extend outwardly beyond the ends 224 and 226 of the hub 222 approximately an equal distance. The generally cylindrical surface of the hub 222 formed by the bore 228 is sized to closely engage the surface 196 of the pivot shaft 190. The hub 222 may be coupled to the pivot shaft 190 such that the arm 212 and pivot shaft 190 conjointly pivot with one another about the axis 168. The shaft 190 may be coupled to the hub 222 by a friction fit therebetween or by a coupling member, such as a key or weld. The pivot shaft 190 may also be integrally formed with the arm 212. Alternatively, the arm 212 may pivot with respect to the pivot shaft 190 about the axis 168.

Figure 28:
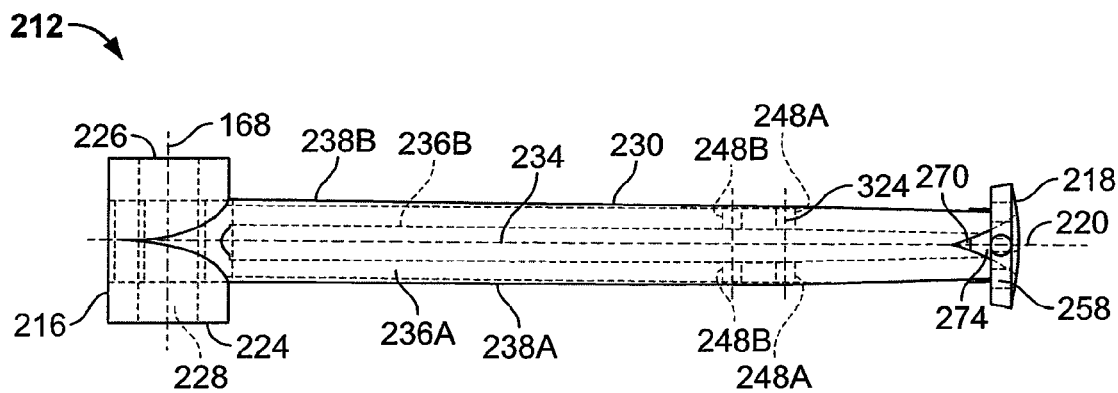
FIG. 28 is a top view of the arm.
Figure 29:
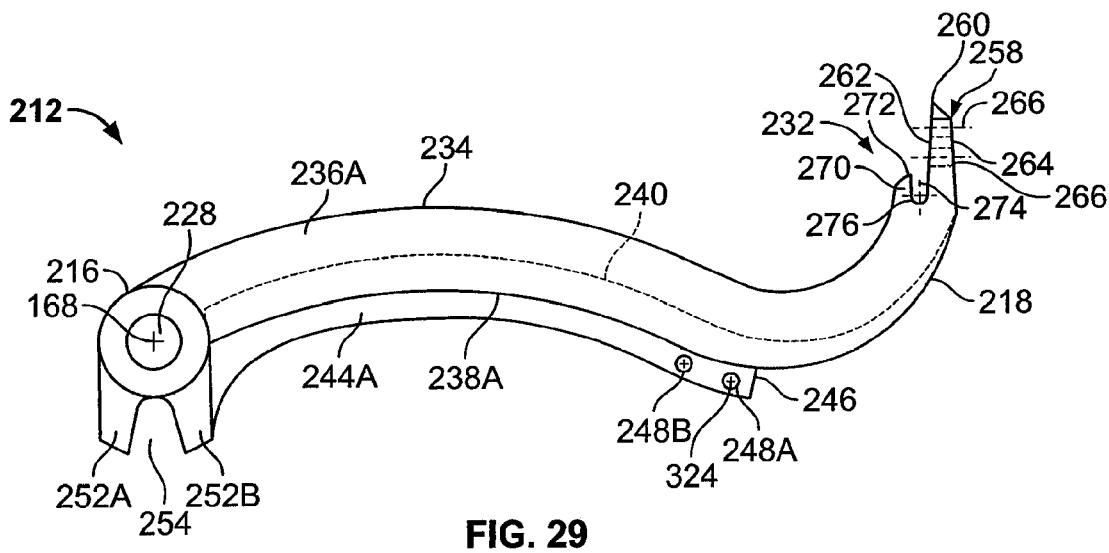
FIG. 29 is a side elevation view of the arm.
Figure 30:
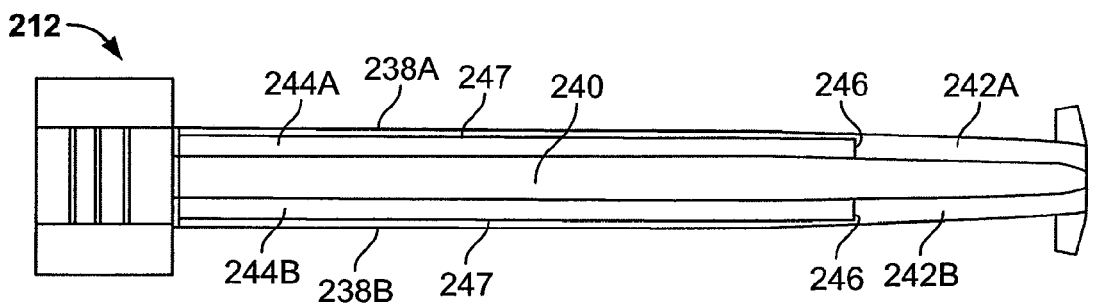
FIG. 30 is a bottom view of the arm.
Figure 31:
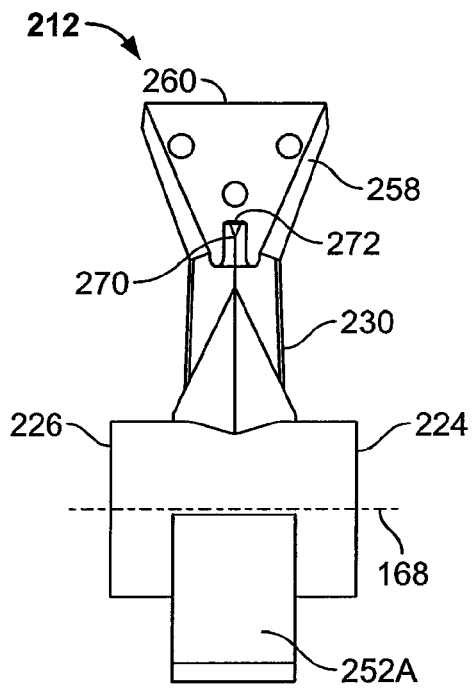
FIG. 31 is a rear elevation view of the arm.
Figure 32:
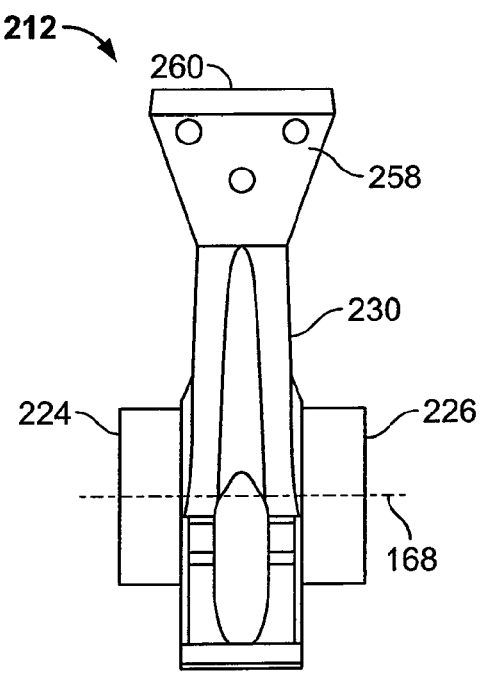
FIG. 32 is a front elevation view of the arm.

The arm 212 includes a strut 230 having a first end coupled to the hub 222 and a second end coupled to a mounting member 232 that is located at the second 218 of the arm 212. As viewed in plan, as shown in FIG. 28, the strut 230 extends generally linearly along the axis 220. As viewed in profile or elevation as shown in FIG. 29, the strut 230 is generally S-shaped including a downwardly facing generally concavely curved portion that extends from the hub 222, and an upwardly facing generally concavely curved portion that extends from the downwardly curved portion to the mounting member 232. The strut 230 includes a central ridge 234 that extends from the hub 222 to the mounting member 232. Opposing side walls 236A-B extend downwardly and outwardly from the ridge 234 to respective lower edges 238A-B. Each lower edge 238A-B extends from the hub 222 to the mounting member 232. A channel 240 is located in the bottom wall of the strut 230 that extends from adjacent the hub 222 to the mounting member 232. The channel 240 separates the bottom wall into respective spaced apart first and second bottom wall portions 242A-B. The strut 230 includes a pair of spaced apart ribs 244A-B that extend along respective bottom wall portions 242A-B, from a proximal end located adjacent the hub 232 to a distal end 246 located generally at the bottom end of the upwardly facing concave portion of the strut 230 and spaced apart from the second end 218 of the arm 212. Each rib 244A-B includes one or more apertures 248A-B, with each aperture 248A-B in each rib 244A being aligned with a respective aperture 248A-B in the rib 244B such that the apertures are located coaxially with respect to one another and generally parallel to the axis 168. The ribs 244A-B are located inwardly from, and generally parallel to, the edges 238A-B as shown in FIG. 30 to thereby form a lip between the ribs 244A-B and the edges 238A-B that extends along the bottom wall portions 242A-B. The arm 212 includes a pair of spaced apart lugs 252A-B that are attached to and that project downwardly and outwardly from the hub 222. A slot 254 is located between the lugs 252A-B that extends parallel to the axis 168. The slot 254 is adapted to receive the stem 154 of the base 150 of the upper mounting member 144 of the main frame 92.

The mounting member 232 of the arm 212 includes a bracket 258 having a base attached to the second end of the strut 230. The bracket 258 extends upwardly from the base to a tip 260. The bracket 258 includes an interior surface 262 and a spaced apart exterior surface 264. The interior and exterior surfaces 262 and 264 are generally planar. The interior surface 262 is located in a plane that is generally parallel to the axis 168. The interior surface 264 is located more closely adjacent to the first end 216 of the arm than the exterior surface 264. One or more apertures 266 extend through the bracket 258 from the interior surface 262 to the exterior surface 264.

The mounting member 232 also includes a retainer member 270, such as an upwardly extending finger or ledge, that extends upwardly from the second end of the strut 230. The retainer member 270 is located inwardly from the bracket 258, more closely toward the first end 216 of the arm 212 than the bracket 258. The retainer member 270 extends upwardly to a distal tip 272. A transverse slot 274 extends through the mounting member 232 between the bracket 258 and the retainer member 270. The slot 274 is open at its top end between the tip 272 of the retainer member 270 and the bracket 258, and at each end. The slot 272 forms an interior wall on the retainer member 270 that is generally planar and parallel to the interior surface 262 of the bracket 258. The slot 274 also forms a bottom wall 276 that may be generally semi-circular as shown in FIG. 29, or that may be generally planar or other configurations if desired. The tip 260 of the bracket 258 is located outwardly from the bottom wall 276 of the slot 274 a distance further than the tip 272 of the retainer member 270 is located from the bottom wall 276. The length of the retainer member 270 is thereby shorter than the length of the bracket 258. The arm 212 is preferably formed from corrosion resistant materials and may be formed from metal, such as stainless steel.

Figures 33, 34:
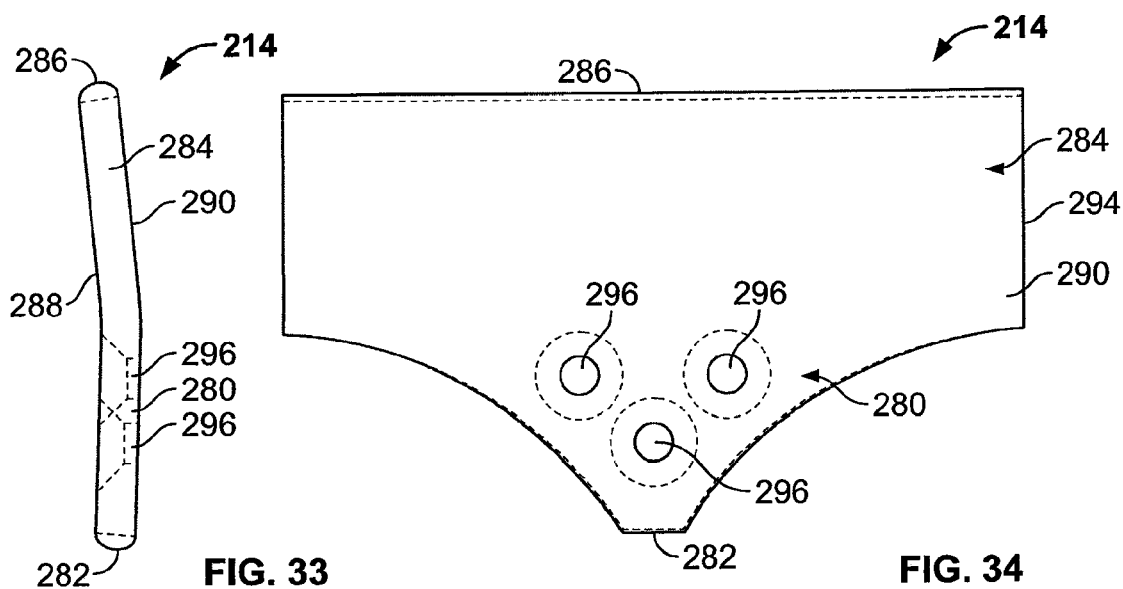
FIG. 33 is a side elevation view of the scraper blade.
FIG. 34 is a front elevation view of the scraper blade of FIG. 33.

The scraper blade 214 of the scraping member 210 is adapted to be removably connected to the mounting member 232 of the arm 212. Alternatively, the scraper blade 214 may be integrally formed with the arm 212. As shown in FIGS. 33 and 34, the scraper blade 214 includes a base 280 having a bottom end 282 and a body 284 extending upwardly from the base 280 to a scraping edge 286. The scraper blade 214 includes an interior surface 288 and a spaced apart exterior surface 290 each of which extend from the bottom end 282 to the scraping edge 286, and from a first end 292 to a second end 294 of the scraper blade 214. As shown in FIG. 33, the interior surface 288 may be curved in a concave cylindrical manner, such as in the shape of a segment of a circle. The surfaces 288 and 290 are generally equally spaced apart from one another. The scraper blade 214 thereby has a generally uniform thickness between the interior surface 288 and exterior surface 290. The base 280 includes one or more apertures 296 that extend from the interior surface 288 to the exterior surface 290 and that are adapted to align with respective apertures 266 in the bracket 258 of the arm 212. The scraper blade 214 may be configured to provide a relatively constant scraping angle with the conveyor belt 82 as the scraper blade 214 wears and is pivoted into continued engagement with the belt 82 about the axis 96.

The scraper blade 214 has a thickness such that the base 280 is adapted to fit closely within the slot 274 of the mounting member 232 of the arm 212 with the interior surface 288 of the base 280 located closely adjacent the interior surface of the retainer member 270 and the exterior surface 290 located closely adjacent to the interior surface 262 of the bracket 258. The bottom end 282 of the base 280 may be curved in the form of a semi-circle to matingly engage the bottom wall 276 of the slot 274 in the mounting member 232. Alternatively, the bottom end 282 of the base 280 may be generally planar, and the bottom wall 276 of the slot 274 may be planar, for mating engagement. The scraping edge 286 of the scraper blade 214 may be rounded in the general shape of a semi-circle as shown in FIG. 33. Alternatively, the scraping edge 286 may be generally planar. The scraping edge 286 may comprise a wear-in tip as disclosed in U.S. Pat. No. 6,374,991 of Martin Engineering Company, which is incorporated herein by reference. The scraper blade 214 is removably connected to the mounting member 232 of the arm 212 by fasteners that extend through the apertures 296 in the scraper blade 214 and the apertures 266 in the bracket 258 of the mounting member 232. The scraper blade 214 is thereby removable and replaceable on the arm 212, such as for example when the scraper blade 214 becomes worn or damaged. Each scraping member 210 is individually selectively removable and replaceable on the main frame 92 by removal of the appropriate caps 172 and 180.

The fasteners that connect the scraper blade 214 to the mounting member 232 prevent transverse movement of the scraper blade 214 with respect to the bracket 258. Frictional scraping forces applied to the scraping edge 286 of the scraper blade 214 from engagement with the moving conveyor belt 82 are resisted at least in part by engagement of the base 280 of the scraper blade 214 with the retainer member 270 of the mounting member 232. A frictional scraping force applied to the scraping edge 286 by the moving belt 82 presses the exterior surface 290 of the scraper blade 214 into engagement with the tip 260 of the bracket 258, and will attempt to pivot the bottom end 282 of the scraper blade 214 away from the interior surface 262 of the bracket 258, such that the scraper blade 214 would pivot about the tip 260 of the bracket 258. However, this pivotal movement of the scraper blade 214 is prevented by engagement of the base 280 of the scraper blade 214 with the interior surface 288 of the retainer member 270 of the mounting member 232. The scraper blade 214 may be formed from metal, such as stainless steel, and may include wear-resistant materials at the scraping edge 286 such as tungsten carbide or ceramic materials.

The cleaner mechanism 86 also includes one or more damper mechanisms 302. Each damper mechanism 302 is associated with a respective scraping member 210. The damper mechanism 302 includes a first end 303 and a second end 305. Each damper mechanism 302 includes a damper 304 and may include a sensor enclosure or box 306. As shown in FIGS. 37-39, the box 306 includes a generally rectangular housing 308 that forms one or more internal chambers 310. The box 306 also includes a removable and replaceable generally planar side panel 312 on each side of the box 306. The side panels 312 are removably attached to the housing 308 to provide selective access to the chambers 310. The side panels 312 are attached to the housing 308 in sealed engagement such that the box 306 is substantially weather and water tight. An end wall of the housing 308 includes an aperture 314 in communication with the chambers 310. A cord grip member 316 is attached to the housing 308 in communication with the aperture 314 such that one or more electrical cords or cables may extend from a controller within the chambers 310 of the housing 308 to the cord grip member 124 and chamber 122 of the main frame 92. The cord grip member 316 maintains the box 306 water tight.

A mounting tab 320 is attached to the top of the housing 308 at the second end 305 of the damper mechanism 302. The mounting tab 320 includes a bore 322 that extends therethrough along a central linear pivot axis 324. The mounting tab 320 has a width between opposing side walls at each end of the bore 322 that enables the mounting tab 320 to be inserted between the ribs 244A-B of the arm 212, with the bore 322 in coaxial alignment with a respective pair of apertures 248A-B in each of the ribs 244A-B. A fastener, such as a bolt and nut, extends through the apertures 248 and bore 322 to thereby pivotally connect the damper mechanism 302 to the arm 212 such that the damper mechanism 302 and arm 212 are pivotal with respect to one another about the pivot axis 324. The housing 308 also includes a mounting member 326 on the opposite side of the housing 308 from the mounting member 320. The mounting member 326 includes a threaded bore 328 that extends along a generally linear axis 330 and that is in communication with the chambers 310.

Figure 35:
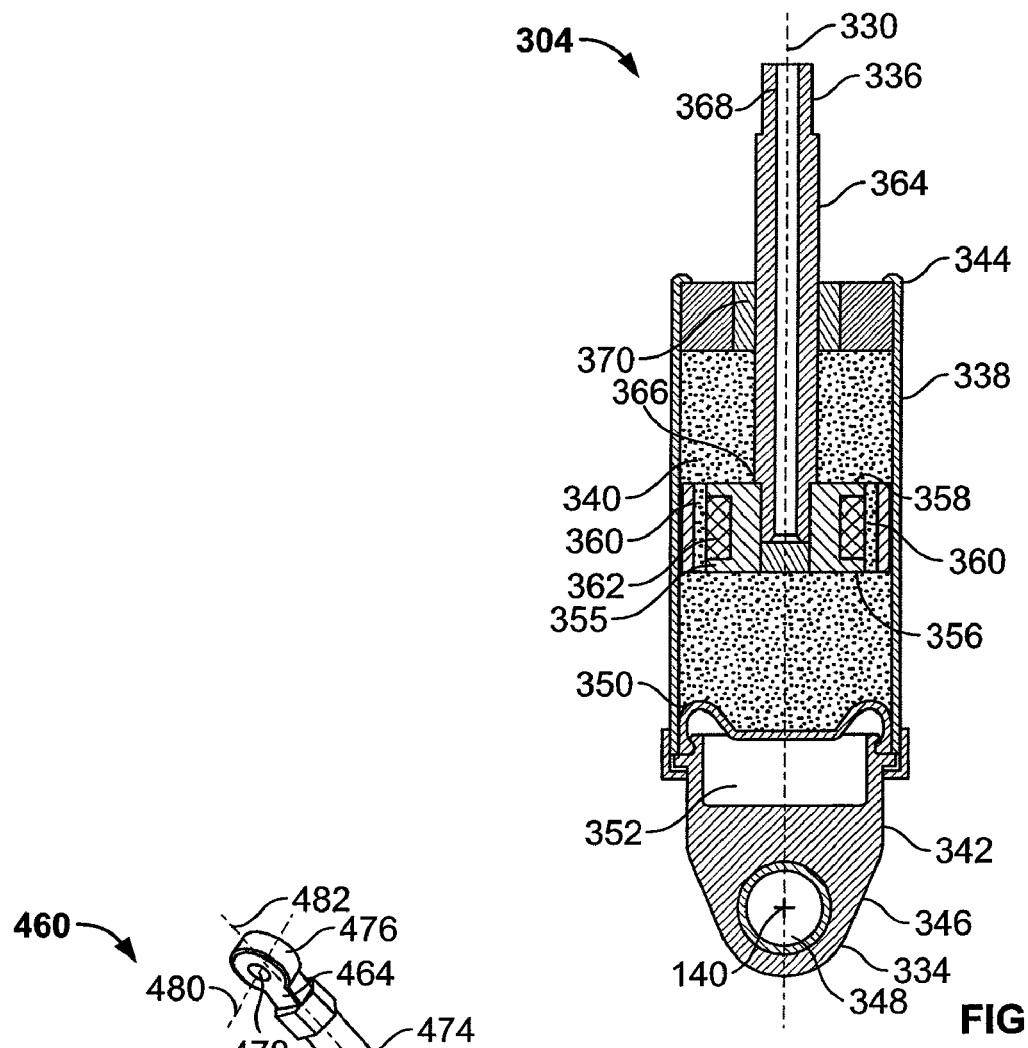
FIG. 35 is a cross sectional view of the damper.
Figure 36:
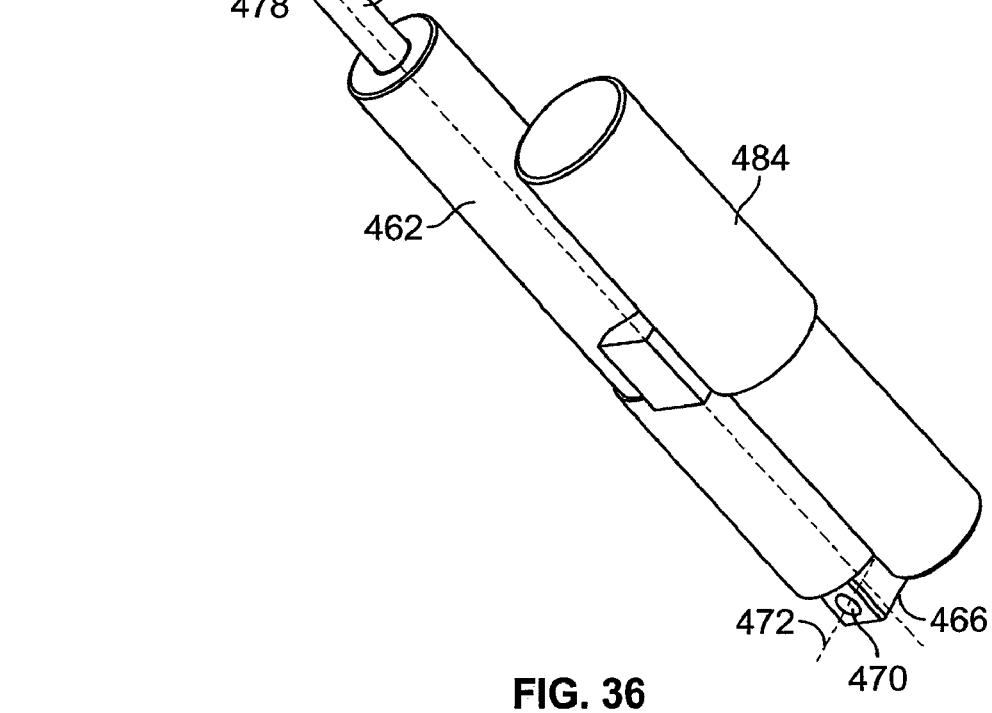
FIG. 36 is a perspective view of the linear actuator mechanism of the rotational positioning mechanism.

The damper 304, as shown in FIG. 35, extends between a first end 334 and a second end 336. The damper 304 may comprise a combination gas spring and damper, such as a magneto-rheological (MR) fluid damper, for example the Model RD-1119 MR fluid damper as manufactured by Lord Corporation. The damper 304 may be constructed and operate as generally disclosed in U.S. Pat. No. 5,277,281, which is incorporated herein by reference. The damper 304 includes a generally cylindrical and tubular housing 338 forming an internal fluid chamber 340. The housing extends from a first end 342 to a second end 344. A mounting member 346 is attached to the first end 342. A bore 348 extends through the mounting member 346 along the axis 140. The mounting member 346 may include a pair of spaced apart ears through which the bore 348 extends, such that a mounting tab 136 of the lower mounting member 126 of the main frame 92 is adapted to be received between the ears, and such that a fastener may extend through the bore 348 of the mounting member 346 and through the aperture 138 of the mounting tab 136 such that the damper mechanism 302 is pivotal with respect to the main frame 92 about the pivot axis 140.

A diaphragm 350 is located within the housing 338 and separates the fluid chamber 340 from an accumulator chamber 352 located at the second end 334 of the housing 338. The accumulator chamber 352 may include a pressurized gas, such as nitrogen. The fluid chamber 340 includes an MR fluid, such as a fluid consisting of carbonyl iron particles suspended in silicone oil. The damper 304 includes a piston 354 having a piston head 355 located within the fluid chamber 340 and that includes a first side 356 and a second side 358. The piston head 355 divides the fluid chamber 340 into sub-chambers respectively located on each side of the piston head 355. The piston head 355 includes one or more fluid passages 360 that extend through the piston head 355 between the first and second sides 356 and 358 which place the sub-chambers of the fluid chamber 340 in fluid communication with one another. Fluid passages may also be formed between the edge of the piston head 355 and the internal side wall of the housing 338 if desired. The piston 354 includes an electrical coil 362 wrapped around the piston head 355. The piston head 355 is made of a magnetically permeable material.

The piston 354 includes a generally tubular shaft 364 having a first end 366 connected to the piston head 355 and a second end 368 that is threaded and located externally of the housing 308. The second end 368 of the shaft 364 is adapted to be inserted into the threaded bore 328 for rigid connection to the mounting member 326 of the control box 306. The shaft 364 extends concentrically about and along a linear axis 330. The shaft 364 extends through the second end 344 of the housing 338 and is sealed fluid tight thereto with a seal 370. Electrical wires extend from the electrical coil 362 through the central bore within the shaft 364 and outwardly from the second end 368, through the bore 328 and into chamber 310 of the box 306 for connection to an auxiliary controller 305.

The piston 354 is linearly slideable along the axis 330 with respect to the housing 338 in each direction along the axis 330. As the piston 354 moves along the axis 330 with respect to the housing 338 MR fluid will flow from a first sub-chamber to a second sub-chamber through the fluid passages 360 to thereby allow sliding movement of the piston 354 with respect to the housing 338. The accumulator 352 accommodates MR fluid displaced by the insertion of the shaft 364 into the fluid chamber 340 and thermal expansion of the MR fluid. Selected variation in the magnetic flux generated by the electrical coil 362 provides a corresponding change in the flow characteristics of the MR fluid. MR fluids are able to change stiffness or viscosity over a very large range. Controlling the flow characteristics of the MR fluid thereby provides control over the ability of the piston 354 to move along the axis 330 with respect to the housing 338 and to thereby dampen vibrations resulting from vibratory forces applied to the piston 354. Kinetic energy from the moving conveyor belt 82 is transferred to the damper 304 through the scraping member 210. The MR fluid in the damper converts the kinetic energy into heat and transfers the heat to the atmosphere. The damper 304 provides a relatively constant transfer of axial force between the first end 334 and second end 336 regardless of the displacement of the piston 354 with respect to the housing 338, and while dampening vibration of the scraper blade 214 with respect to the belt 82. While the control box 306 is shown in the drawings as connecting the second end 368 of the piston 354 to the arm 212, if desired, the second end 368 of the piston 354 may be pivotally connected directly to the arm 212.

The scraping force with which each scraper blade 214 is biased into engagement with the conveyor belt 82 is provided by the damper 304. Different pressures of the gas in the accumulator chamber 352, and different volumes of the accumulator chamber 352, will provide different force versus displacement output curves. A damper 304 with a large accumulator chamber 352 volume and a short piston stroke is preferred such that the output force versus displacement curve is relatively flat, whereby a relatively constant scraping force and cleaning pressure is provided between the scraper blade 214 and the belt 82. Different types of dampers 304, with different gas pressures and/or different accumulator chamber volumes, can be used as desired to provide a desired scraping force and scraping pressure. The different types of dampers 304 can be exchanged with one another in the cleaner mechanism 86 to selectively change the scraping force with which the scraper blades 214 engage the belt 82.

As stated above, the dampers 304 comprise magnetorheological (MR) fluid dampers that contain MR fluid. The MR fluid has a viscosity that is dependent upon a magnetic field, thus the dampening effect of the MR damper may be adjusted by adjusting the magnetic field applied to the MR fluid. In another embodiment, the dampers 304 comprise electrorheological (ER) dampers that contain ER fluid. Similar to the MR fluid, the ER fluid has a viscosity that is dependent upon an electric field, thus the dampening effect of the ER damper may be adjusted by adjusting the electric field applied to the ER fluid. While some embodiments utilize MR fluid dampers or ER fluid dampers, those skilled in the art should appreciate that the dampers 304 may comprise other types of controlled dampers to achieve the desired controlled dampening effect. If desired the damper 304 may include a resilient biasing member, such as a mechanical coil spring, that extends around the housing 338 and piston 354 with a first end of the biasing member coupled to the housing 338 and a second end coupled to the piston 354.

The lugs 252A and B of the arm 212 are adapted to engage the stem 154 of the upper mounting member 144 to limit pivotal movement of the arm 212 about the pivot axis 168. The lugs 252A-B thereby limit the possible length of stroke of the piston 354 of the damper 304, preventing over-retraction of the piston 354 which could damage the diaphragm 350 and preventing over-extension of the piston 354 which could damage the seal 370.

The upper mounting member 144 is designed so that the scraper blades 214 can be either in-line, or offset and overlapping. As shown in FIG. 1, all of the scraper blades 214 are located in-line with one another. If desired, the upper mounting member 144 of the main frame 92 may be divided into a plurality of segments wherein each segment includes a first and second cradle 156 respectively at each end. Every other mounting member segment is reversed end for end to facilitate an offset and overlapping scraper blade arrangement. Due to the offset of the stems 154, the cradles 156 of every other mounting segment will be aligned with one another, with one set of cradles being aligned along the pivot axis 168 and a second set of cradles 156 being aligned along a parallel pivot axis that is spaced apart from and parallel to the pivot axis 168. The parallel pivot axes may be offset from one another a selected distance such as, for example, twenty-five millimeters. A first set of every other scraping members 210 will thereby be aligned with one another, while a second set of the remaining scraping members 210 will be aligned with one another. The scraper blades 214 of adjacent scraping members 210 are thereby offset with one another, such that the scraper blades 214 may overlap one another along the width of the belt. The width of the scraper blades used in the offset position are preferably wider than the width of the scraper blades used in the in-line position to provide overlapping of adjacent scraper blades. Alternatively, the cradles 156 can be divided, with end caps 172 used in place of center caps 180, and the spacing of the individual mounting members 144 can be located closer to one another to provide overlapping of adjacent scraper blades. The damper mechanisms 302 are pivotally connected to the apertures 248A of the first set of aligned scraping members 210, and the damper mechanisms 302 are pivotally connected to the apertures 248B of the second set of aligned scraping members 210.

When the scraping members 210 are configured in an offset and overlapping arrangement, the scraper blade 214 of each scraping member 210 may be pivotally mounted to the mounting member 232, such as by a single fastener extending through an aperture 226 and an aperture 296, such that the scraper blade 214 is pivotal with respect to the arm 212 about a pivot axis that is generally transverse to the axis 168. The bottom end 282 of the blade 214 is spaced apart from the bottom wall 276 of the slot 274 in the retainer member 270 when the blade 214 is in a centered position, such that the blade 214 can pivot in either direction about the pivot axis such as, for example, plus or minus five degrees before the base 280 of the blade 214 engages the bottom wall 276 of the slot 274. In this configuration, a wear-in tip should additionally be provided at the corners formed by the scraping edge 286 and the ends 292 and 294 of the blade 214 to prevent gouging of the belt 82 as the blade 214 adapts to the belt surface 84.

The cleaner mechanism 86 also includes a deflector shroud 374. As shown in FIGS. 40-45, the deflector shroud 374 includes a first side wall 376 and a mirror-image second side wall 378. The first and second side walls 376 and 378 are spaced apart and generally parallel to one another, and extend between a front wall 380 and a rear wall 382. The first and second side walls 376 and 378 also each extend between a lower edge 384 and an upper edge 386. A passageway extends through the deflector shroud 374 from an opening formed in the top end of the deflector shroud 374 between the upper edges 376 of the first and second sidewalls 376 and 378 to an opening formed in the bottom end of the deflector shroud 374 between the lower edges 384 of the first and second side walls 376 and 378. Each side wall 376 and 378 includes a pocket 388 adapted to receive the damper 304 therebetween.

As shown in FIGS. 4 and 5, the damper mechanism 302 extends through the passageway in the deflector shroud 374 with the damper 304 located in the pockets 388. The upper edge 386 of the first and second side walls 376 and 378 matingly engage the edges 238A-B of the strut 230 of the scraper member 210 to form a seal therebetween. The deflector shroud 374 thereby substantially encloses the damper mechanism 302, and totally encloses the box 306 and the upper end of the damper 304, to prevent material scraped from the belt 82 by the scraper blade 214 from impacting on or engaging these components. The deflector shroud 374 may be made from an elastomeric material, such as urethane.

Figure 44:
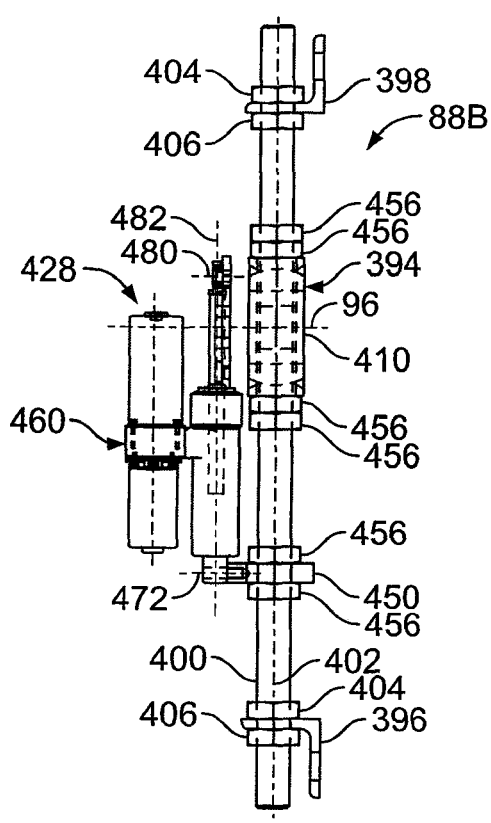
FIG. 44 is a front elevation view of a mounting mechanism of the conveyor belt cleaner.
Figure 45:
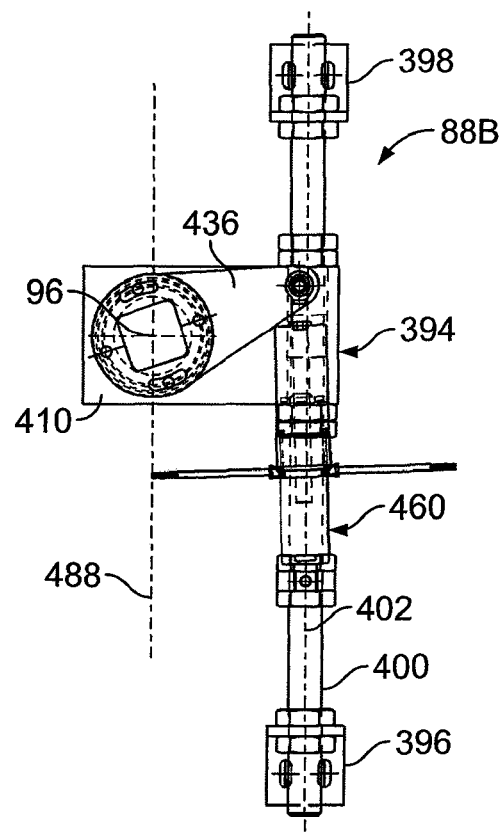
FIG. 45 is a side elevation view of the mounting mechanism.
Figure 46:
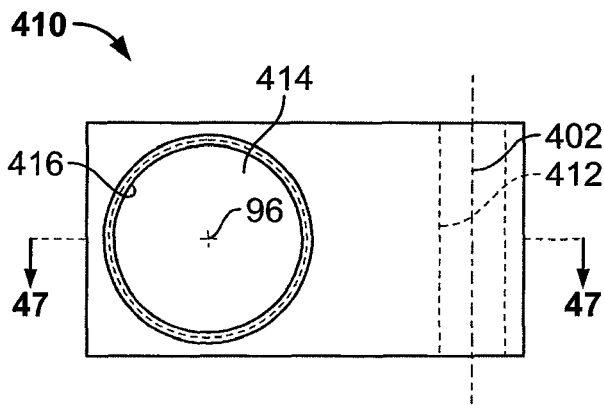
FIG. 46 is a side elevation view of a support bracket of the mounting mechanism.
Figure 48:
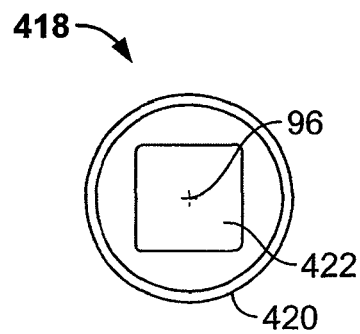
FIG. 48 is a side elevation view of a bushing of the mounting mechanism.
Figure 47:
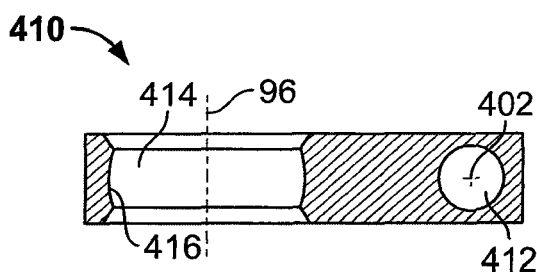
FIG. 47 is a cross sectional view taken along line 47-47 of FIG. 46.
Figure 49:
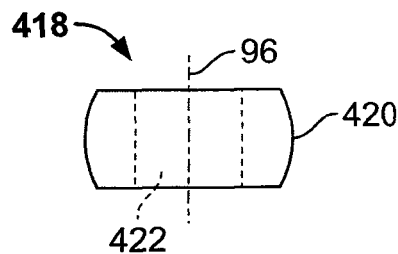
FIG. 49 is a plan view of the bushing of the mounting mechanism.

The mounting mechanisms 88A-B may be constructed generally as mirror-images of one another. The mounting mechanism 88B is shown in FIGS. 44 and 45. Each mounting mechanism 88A-B includes a linear positioning mechanism 394 having a lower mounting bracket 396 and an upper mounting bracket 398, such as angle irons. A vertical leg of the mounting brackets 396 and 398 includes apertures such that the vertical leg is adapted to be removably attached to a stationary support structure. Each horizontal leg of the mounting brackets 396 and 398 includes an aperture. A linear actuator such as a threaded rod or shaft 400 having a central linear axis 402 extends between the lower and upper mounting brackets 396 and 398 and through the apertures in the horizontal legs thereof. A pair of support nuts 404 are threadably attached to the shaft 404, with a respective support nut 404 engaging the top surface of the horizontal leg of the mounting brackets 396 and 398. A pair of locking nuts 406 are threadably engaged to the shaft 404, with a respective locking nut 406 being located adjacent the bottom surface of a respective horizontal leg of each of the mounting brackets 396 and 398. The locking nuts 406 may be selectively moved away from the mounting brackets 396 and 398 such that the shaft 404 is selectively rotatable about the axis 402 in either a clockwise or counter-clockwise direction as desired. The locking nuts 406 may be engaged against the mounting brackets 396 and 398 to thereby prevent rotation of the shaft 400 about the axis 402. The linear actuator 400 may alternatively comprise an electrical, hydraulic or pneumatic actuator respectively positioned at each end of the main frame 92.

The linear positioning mechanism 394 also includes a support bracket 410. The support bracket 410 includes a generally linear bore 412 that extends from the bottom end to the top end of the support bracket 410 and that is adapted to receive the threaded shaft 400. The support bracket 410 also includes a passageway 414 that extends generally horizontally and transversely to the bore 412 through the support bracket 410 between opposite side walls. The passageway 414 includes a generally circular and concave receptacle 416 that is adapted to receive a generally circular bushing 418. The bushing 418 includes a generally circular and convex outer wall 420 that is adapted to rotatably engage and mate with the receptacle 416. The bushing 418 also includes a central bore 422 that is adapted to receive and matingly engage a stub shaft 110A or B of the main frame 92 such that the main frame 92 and the bushing 418 are conjointly rotatable about the axis 96 with respect to the support bracket 410. The support brackets 410 of the mounting mechanisms 88A-B respectively receive and support the opposing ends of the main frame 92 within the bushings 418. The support brackets 410 and the cleaner mechanism 86 are selectively moveable in a generally linear direction along the axis 402 of the shafts 400 in either direction, upwardly or downwardly, by appropriate lifting or lowering of the threaded shafts 400 about their respective axes 402 by means of nuts 456. If desired electrically operated rotational actuators may be operatively coupled to each shaft 400 to provide selected rotation of the shafts 400 and thereby selective positioning of the cleaner mechanism 86. Shaft 401 may be keyed to bore 412 to limit horizontal shifting of the assembly 80 relative to the cross axis of conveyor belt 82.

One or both mounting mechanisms 88A-B may include a rotational positioning mechanism 428. The rotational positioning mechanism 428 includes a collar 430, such as a generally planar plate, including a central aperture 432 adapted to matingly receive a stub shaft 110A or B such that the collar 430 and the main frame 92 are conjointly rotatable with one another about the axis 96. The collar 430 also includes a plurality of peripheral apertures and arcuate slots 434. The rotational positioning mechanism 428 also includes a pivot arm 436. The first end 438 of the pivot arm 436 includes a generally circular central aperture 442 adapted to receive the stub shaft 110A or B of the main frame 92. The first end 438 also includes a plurality of peripheral apertures 444 spaced in a generally uniform manner about the central aperture 442. The first end 438 of the pivot arm 436 is adapted to be removably connected to the collar 430 by fasteners that respectively extend through the peripheral apertures 434 and 444. The position of the pivot arm 436 with respect to the collar 430 about the axis 96 may be adjusted by selectively placing the fasteners within the slotted apertures 434 of the collar 430. The second end 440 of the pivot arm 436 includes an aperture 446 that is spaced apart from the central aperture 442.

The rotational positioning mechanism 428 also includes a support bracket 450 having a bore 452 adapted to threadably receive the threaded shaft 400 such that the support bracket 450 is located on shaft 402 by means of nuts 456 and supported by the shaft 400. The support bracket 450 also includes a longitudinal threaded bore 452 extending inwardly into the support bracket 450 generally transversely to the central axis of the threaded bore 452. The support bracket 450 is threadably attached to the threaded shaft 400 spaced apart from and below the bottom of the support bracket 410 of the linear positioning mechanism 394. The central axis of the threaded bore 454 extends generally perpendicular to the axis 402. One or more locking nuts 456 are threadably engaged to the shaft 400 and are located above and below the support bracket 410 and the support bracket 450 to selectively lock the brackets in place with respect to the threaded shaft 400.

The rotational positioning mechanism 428 also includes a linear actuator mechanism 460. The linear actuator mechanism 460 includes a fluid cylinder 462 having a first end 464 and a second end 466. The fluid cylinder 462 includes a housing 468 having an aperture 470 at the second end 466. The aperture 470 extends along a generally linear axis 472. An extendable and retractable linear ram 474 extends outwardly from the first end of the housing 468 to a distal end 476 having an aperture 478. The aperture 478 extends along an axis 480 that is parallel to and spaced apart from the axis 472. The ram 474 extends along a central longitudinal axis 482 that extends from the first end 464 to the second end 466 of the fluid cylinder 462. The longitudinal axis 482 is perpendicular to the axes 472 and 480.

The second end 466 of the fluid cylinder 462 is pivotally attached to the support bracket 450 by a fastener that extends through the aperture 470 and into the threaded bore 454 of the support bracket 450. The fluid cylinder 464 is thereby pivotal with respect to the support bracket 450 about the axis 474. The first end 464 of the fluid cylinder 462, and thereby the distal end 476 of the ram 474, is pivotally attached to the second end 440 of the pivot arm 436 by a fastener that extends through the aperture 478 and the aperture 446. The fluid cylinder 462 is thereby pivotal with respect to the pivot arm 436 about the axis 480. The distal end 476 of the ram 474 may be selectively moved in either direction, extended or retracted, with respect to the housing 462 along the axis 482 with respect to the housing 462.

The linear actuator mechanism 460 also includes an electrical motor operatively connected to a fluid pump 484 that is in fluid communication with the fluid cylinder 462. The electrical motor is in electrical communication with the auxiliary controllers 305 in the control boxes 306. The fluid pump 484 provides for the selective extension and retraction of the ram 474. The fluid cylinder 462 and fluid pump 484 may be hydraulically operated, or if desired may be pneumatically operated. The linear actuator mechanism 460 may be operated on direct current (DC) voltage, such as at twenty-four volts DC. The linear actuator mechanism 460 may be the Mini Motion Package actuator as manufactured by KYB Corporation.

As viewed in FIG. 45, simultaneous extension of the rams 474 of the linear actuator mechanisms 460 of the mounting mechanisms 88A-B will pivot or rotate the pivot arms 436 and the cleaner mechanism 86 in a counter-clockwise direction about the axis 96. Retraction of the rams 474 will pivot the pivot arms 436 and cleaner mechanism 86 in a clockwise direction about the axis 96. Whether one or both of the mounting mechanisms 88A and B include a rotational positioning mechanism 428 may be determined based on the force output of the linear actuator mechanism 460 and the width of the conveyor belt 82. For example, only one mounting mechanism 88A or B may include a rotational positioning mechanism 428 when used in connection with belts up to approximately 1200 millimeters (48 inches) wide, whereas both mounting mechanisms 88A and B may include respective rotational positioning mechanisms 460 when used in connection with wider belts.

As shown in FIG. 7, the scraper blade 214 is disposed at a positive cleaning or rake angle of approximately forty-five degrees with respect to the surface 84 of the conveyor belt 82. A positive cleaning or rake angle, also known as a peeling angle, is one wherein the scraper blade is slanted into the direction of travel of the conveyor belt. As shown in FIG. 8, the scraper blade 14 is disposed at a negative cleaning or rake angle of approximately minus ten degrees with respect to the surface 84 of the conveyor belt 82. A negative cleaning or rake angle, also known as a scraping angle, is one wherein the scraper blade is slanted in the same direction as the direction of belt travel. A zero rake cleaning angle is one where the scraper blade is perpendicular to the surface of the belt 82.

The cleaning angle of the cleaner mechanism 86 can be varied as desired between the aforementioned cleaning angles by changing the mounting distance between the rotational axis 96 of the main frame 92 and the surface 84 of the conveyor belt 82. Appropriate rotation of the shafts 400 of the mounting mechanisms 88A-B move the pivot axis 96 of the cleaner mechanism 86 along a plane 488 that is generally parallel to the central axes 402 of the shafts 400 toward the surface of the conveyor belt 82. When the shafts 400 are rotated in an opposite direction, the pivot axis 96 of the cleaner mechanism 86 will move along the plane 488 in an opposite direction away from the surface of the conveyor belt 82. The linear positioning mechanism 394 thereby allows selective placement of the pivot axis 96 of the cleaner mechanism 86 along the plane 488, such that the scraper blades 214 engage the surface 84 of the conveyor belt 82 at a desired cleaning angle, such as anywhere between a positive rake cleaning angle of forty-five degrees to a negative rake cleaning angle of minus ten degrees. Other ranges of cleaning angles may be used as desired. The cleaning angle of the scraper blades 214 can be adjusted after installation of the conveyor belt cleaner 80 to fine tune the cleaning angle to an optimal cleaning angle, and to change the cleaning angle as may be needed due to changes in belt speed, changes in the conveyed material, or changes in other operational parameters. Such adjustment can be done manually or automatically.

Once the cleaner mechanism 86 is located in its desired mounting position along the plane 488, the linear actuator mechanism 460 of the rotational positioning mechanism 48 rotates the cleaner mechanism 86 about the axis 96. Extension of the ram 474 of the fluid cylinder 462 will pivot the pivot arm 436 and the cleaner mechanism 86 in a counter-clockwise direction, as viewed in FIGS. 7 and 45, to rotate the scraper blades 214 into engagement with the conveyor belt 82 such that the dampers 304 resiliently bias their respective scraper blades 214 into engagement with the surface of the conveyor belt 82 with a desired amount of force and scraping pressure.

Retraction of the ram 474 of the fluid cylinder 462 will pivot the pivot arm 436 and cleaner mechanism 86 in a clockwise direction as viewed in FIGS. 7 and 45 and thereby disengages the scraper blades 214 from the conveyor belt 82. The rotational positioning mechanism 428 may thereby disengage the cleaner mechanism 86 from the conveyor belt 82 when the belt 82 reverses its direction of travel, or for purposes of maintenance. The linear actuator mechanisms 460 of the rotational positioning mechanisms 48 will rotate the scraper blades 214 about the axis 96 into continuing scraping engagement with the belt 82 as the scraper blades 214 wear during use while maintaining a substantially constant cleaning angle and cleaning pressure. Position indicating sensors such as magnetic switches may be used to limit the travel of arm 436.

Each damper 304 respectively dampens vibration of its associated scraper blade 214 with respect to the conveyor belt 82 during operation. Each damper 304 is individually controlled by a respective auxiliary controller 305 in its associated box 306, such that dampening of each scraper blade 214 can be individually controlled. The dampening characteristics of each damper 304 may be varied during operation of the conveyor belt cleaner 80 to accommodate changes in operating conditions. The operating condition of the accessory bulk material handling apparatus, such as the conveyor belt cleaner 80, air cannon, or industrial vibrator, and the operating condition of the combination of these accessory apparatus with a primary bulk material handling apparatus, is determined by sensing and monitoring the vibration emitted by the combination of the accessory and primary apparatus. Changes in the emitted vibration are used to initiate control of the accessory apparatus, such that the combination of the accessory apparatus and the primary apparatus will operate at an optimum level of performance.

The geometrical arrangement of the cleaner mechanism 86 is generally illustrated in FIG. 56 in connection with an X-Y rectangular coordinate system. The geometrical arrangement of the cleaner mechanism 86 enables the cleaner mechanism 86 to be used with the scraper blades 214 in engagement with the belt 82 at positive, zero, or negative rake cleaning angles "CA". If the axis that determines the arc and bias of the scraper blades 214 was located coaxial with the axis 168, the cleaner mechanism 86 could only be used at positive rake cleaning angles, because raising the cleaner mechanism 86 along the plane 488 for operation at a zero or negative rake cleaning angle would create an interference between the arm 212 and the belt 82 unless the scraper blade engages the belt on the arc of a pulley. As shown in FIG. 56, a virtual pivot axis 490 is provided that defines the curvature and bias angle of the scraper blade 214. The virtual pivot axis 490 is spaced apart from and parallel to the pivot axis 168 and is located above the pivot axis 168 between the pivot axis 168 and the belt 82. If the virtual pivot axis 490 was located on the pivot axis 168, the bias angle of the scraper blade 214 would be ninety degrees and would provide a constant cleaning angle during wear. When the virtual pivot axis 490 is located above the axis 168 the bias angle of the blade 214 is less than ninety degrees and the cleaning angle remains approximately constant (±5%) during wear using a scraper blade 214 formed in an arc of a circle about the axis 490. Regardless of the mounting height of the belt cleaner mechanism 86 along the plane 488, or the degree of rotation of the belt cleaner mechanism 86 about the axis 96, the geometrical arrangement of the belt cleaner mechanism 86 will maintain a substantially constant cleaning angle between the scraper blades 214 and the belt 82.

Bulk Material Handling Controller

Figure 58:
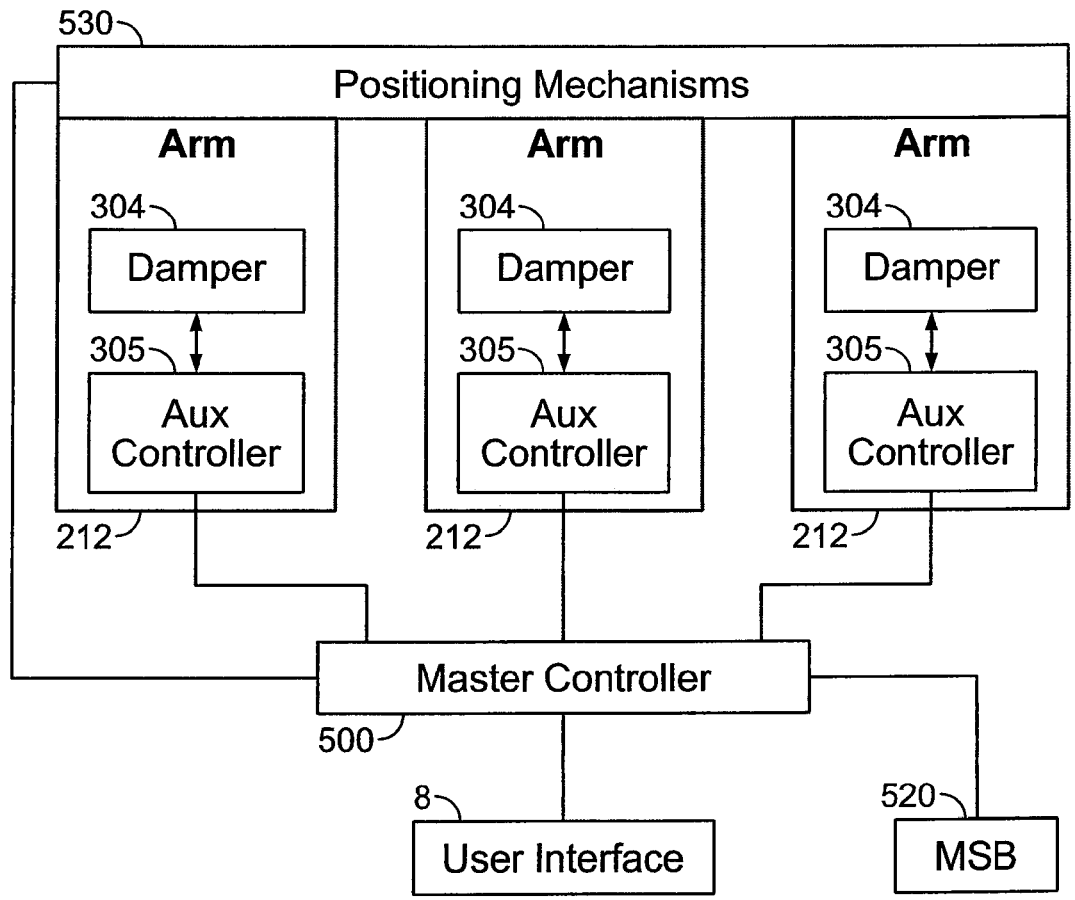
FIG. 58 is a block diagram illustrating a bulk material handling controller of the bulk material handling system in regard to the conveyor belt cleaner depicted in FIGS. 1-56.
Figure 59:
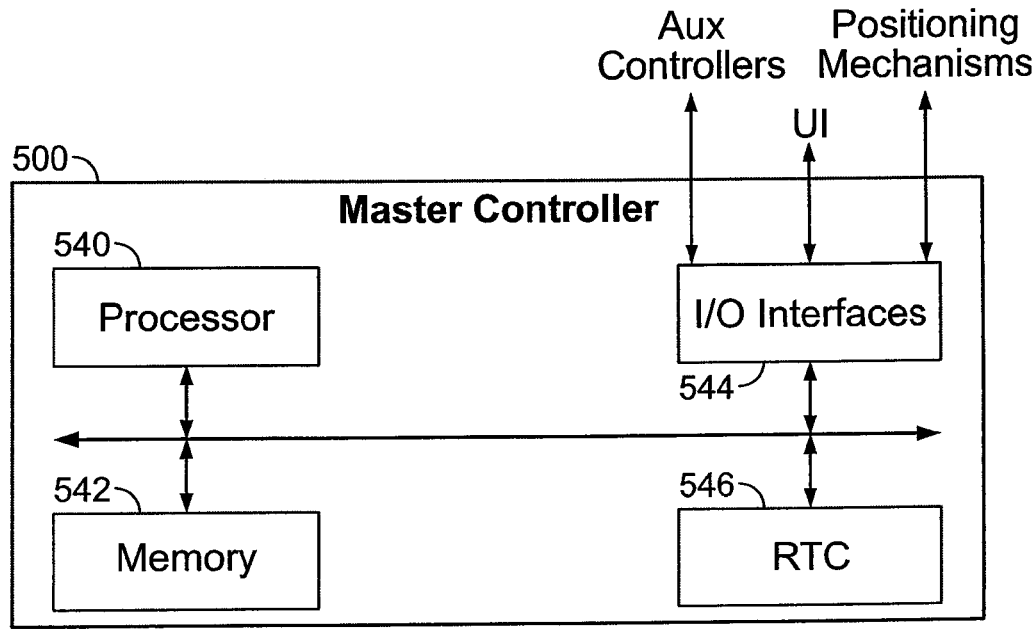
FIG. 59 is a block diagram illustrating a master controller of the bulk material handling controller.
Figure 60:
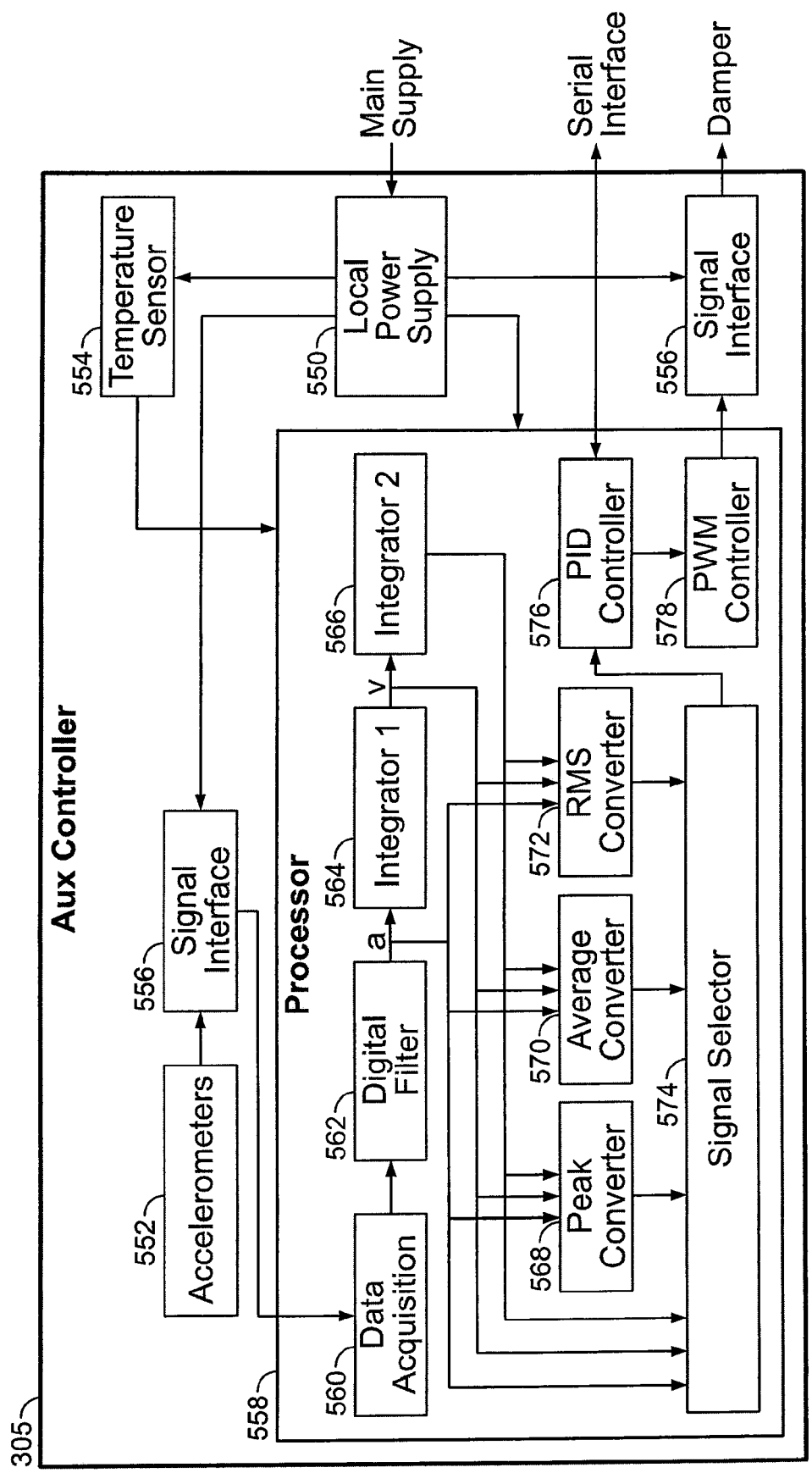
FIG. 60 is a block diagram illustrating an auxiliary controller of the bulk material handling controller.
Figure 61:
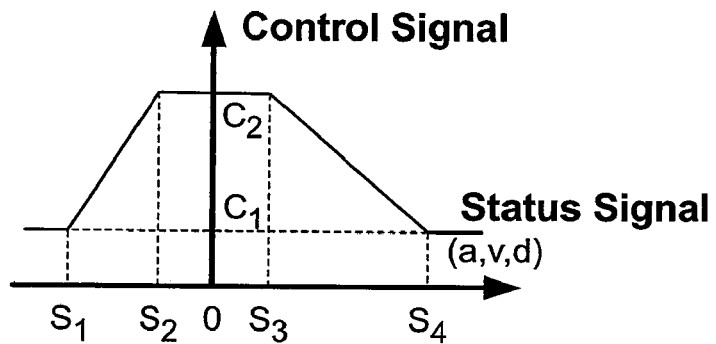
FIGS. 61-64 show various status signal to control signal response patterns suitable for controlling bulk material handling accessories such as a conveyor belt cleaner.
Figure 62:
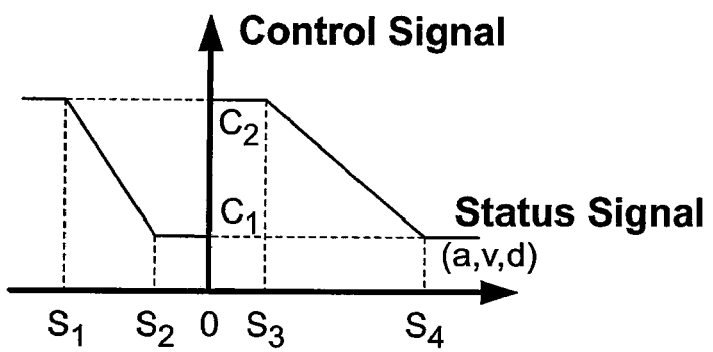
Figure 63:
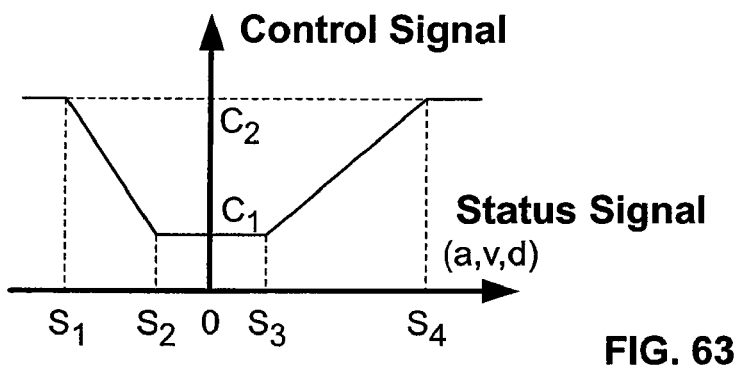
Figure 64:
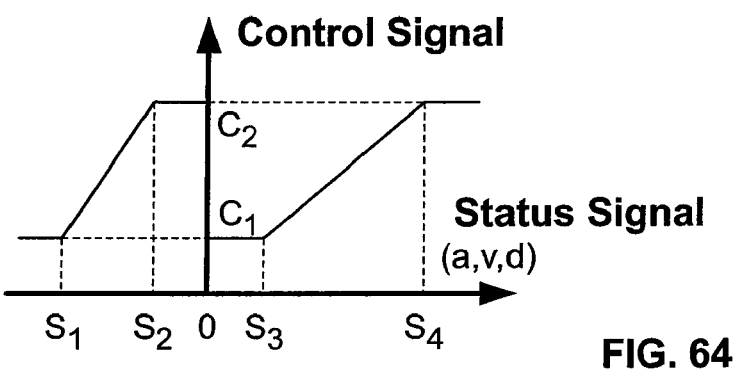

Referring now to FIGS. 58-60, one embodiment of the bulk material handling controller 12 will be described. As depicted, the controller 12 comprises a master controller 500 and one or more auxiliary controllers 305. While the controller 12 may be implemented in a distributed manner as shown in FIGS. 58-60, other embodiments may comprise a single controller 500 without separate auxiliary controllers 305. In such an embodiment, the sensors of the auxiliary controller 305 may be maintained with or near the components being monitored but the logical components (e.g. processors) of the auxiliary controller 305 may be eliminated with the single controller 500 configured to perform the logical tasks of both the master controller and the of auxiliary controllers. In yet another embodiment, the bulk material handling controller 12 may comprise only auxiliary controllers 305 without having a separate master controller 500. In such an embodiment, the tasks of the master controller 500 may be distributed among the auxiliary controller 305, assigned to a single auxiliary controller 305, and/or some tasks of the master controller 500 may be eliminated. Further, to aid one skilled in the art in understanding the construction and the operation of the bulk material handling controller 12, the controller 12 is described below in the context of controlling the belt cleaner mechanism 86. However, those skilled in the art should appreciate that the teachings regarding the bulk material handling controller 12 may be readily applied to other bulk material handling apparatus 4 and/or other bulk material handling accessories 6.

Referring now to FIG. 58, the relationship between components of the bulk material handling controller 12 and components of a bulk material handling accessory such as the belt cleaner mechanism 86 are depicted. As depicted, the master controller 500 is coupled to positioning mechanisms 510 of the belt cleaner mechanism 86 such as, for example, the linear positioning mechanism 394 and the rotational positioning mechanism 428. As such, the master controller 500, in one embodiment, may generate control signals to adjust the positioning of the bulk material handling accessory 6 in relation to the bulk material handler 4. For example, the master controller 500 may generate control signals that cause the linear positioning mechanism 394 to move belt cleaner mechanism 86 closer to the conveyor belt 82 or may generate control signals that cause the linear positioning mechanism 394 to move the belt cleaner mechanism 86 further from the conveyor belt 82. Similarly, the master controller 500 may generate control signals that cause the rotational positioning mechanism 428 to rotate the belt cleaner mechanism 86 in relation to the conveyor belt 82. Via control signals to the linear positioning mechanism 394 and the rotational positioning mechanism 428, the master controller 510 may adjust the force exerted by the scrapper blades 214 upon the belt 82 as well as adjust the angle at which the scrapper blades 214 contact the belt 82.

Each auxiliary controller 305 controls one or more aspects of the bulk material handling accessory 6. In one embodiment, each arm 212 comprises an auxiliary controller 305 that generates control signals which cause respective dampers 304 to controllably dampen vibrations of its associated arm 212. In one embodiment, the auxiliary controller 305 generates the control signal based upon signals received from its sensors such as the accelerometers 502 and the temperature sensor 504. As explained above, the dampers 304 have a controllable dampening rate that is linear with respect to the control signals received from the auxiliary controller 305. Thus, the auxiliary controllers 305 in one embodiment may increase the dampening effect of its damper 304 by increasing the current of the control signal to the damper 304 and may decrease the dampening effect of its damper 304 by decreasing the current of the control signal to the damper 304. However, other embodiments may utilize dampers 304 that have controllable dampening rates that are non-linear with respect to the received control signals, and the auxiliary controllers 305 may generate the control signals to account for the non-linear dampening rates.

A master supply block 520 is also depicted in FIG. 58. In one embodiment, the master supply block 520 receives a power signal from a main power source and conditions and/or transforms the received power signal to provide the controller 12 and accessory 6 with appropriate power signals. In one embodiment, the main power source supplies the master supply block 520 with and AC power signal and the main supply block 520 transforms the received AC power signal into one or more DC power signals that are suitable for the bulk material handling controller 12 and the bulk material handling accessory 6.

The master supply block 520 may further generate a status signal which may be used to provide the master controller 500 with status information. In one embodiment, the master supply block 520 may generate a status signal to inform the master controller 500 of a power failure such as, for example, the master supply block 520 receiving inadequate power from its main power source and/or the master supply block 520 providing inadequate power to components of the bulk material handling system. Moreover, the master supply block 520 may comprise an alternate power source or power reserve such as, for example, high power batteries or supercapacitors that are capable of supplying sufficient power for the bulk material handling controller 12 and bulk material handling accessory 6 to execute a fail response in response to the status signal informing the master controller 500 of a failure of its main power source. For example, the power reserves of the master supply block 520 may provide sufficient power for the controller 12 and accessory 6 to safely respond to a situation wherein the main power source provides no power (e.g. black out) or insufficient power (e.g. brown out). In one embodiment, the master controller 500 may generate control signals that result in the positioning mechanisms 510 retracting the arms 212 from the belt 82 in order to prevent the arms 212 from damaging the belt 82 if the master supply block 520 is unable to supply sufficient power to operate the accessory 6.

Figure 68:
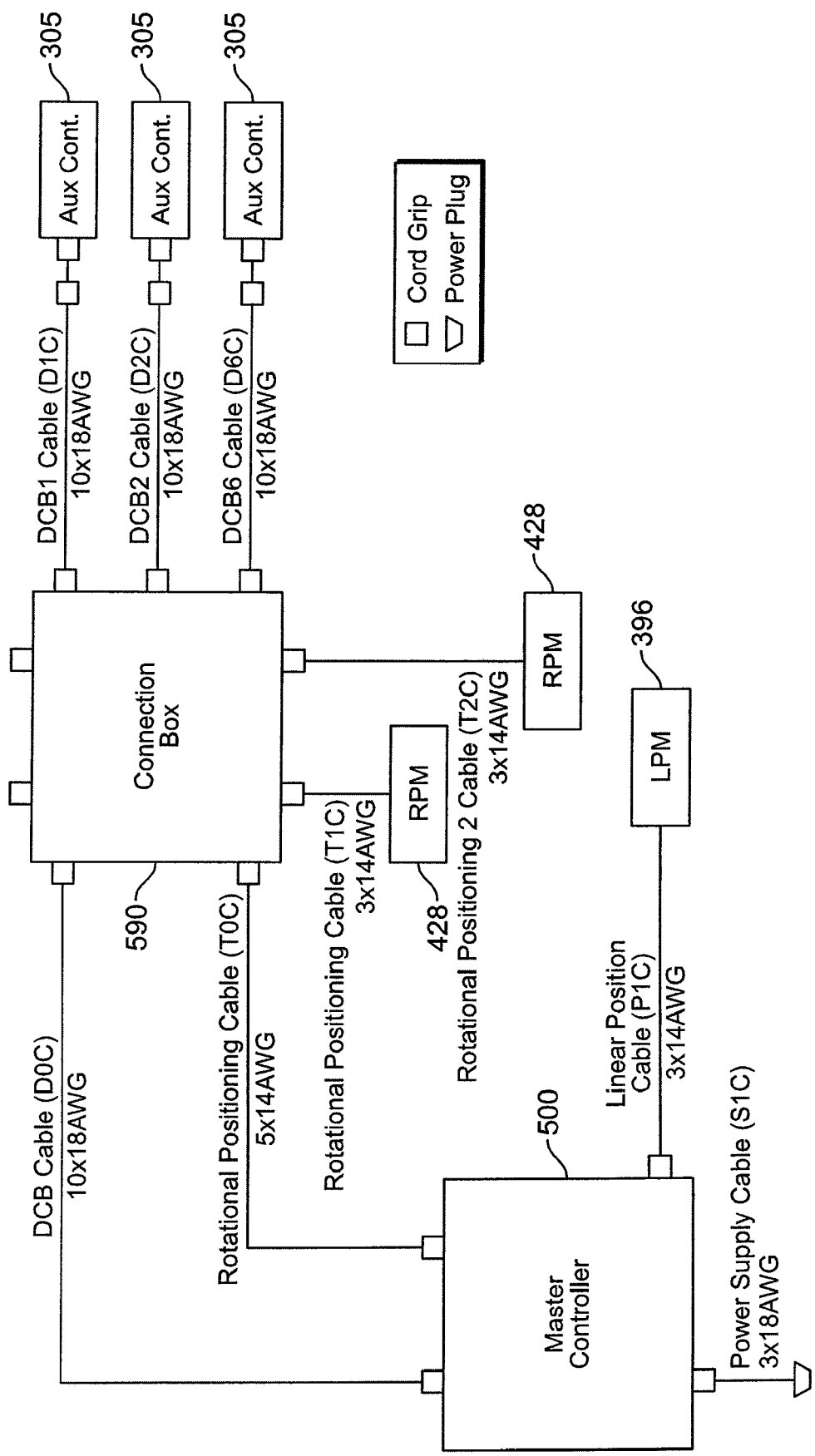
FIG. 68 depicts cable connections of an embodiment of a bulk material handling system.

Further details regarding cable connections between components of the bulk material handling controller 12 and components of a bulk material handling accessory such as the belt cleaner mechanism 86 are depicted in FIG. 68. As shown, each auxiliary controller 305 may be coupled to a connection box 590 via ten (10) 18-gauge cables and each rotational positioning mechanism 428 of the positioning mechanisms 530 may be coupled to the connection box 590 via three (3) 14-gauge cables. The master controller 500 may be coupled to a linear positioning mechanism 396 of the positioning mechanisms 530 by three (3) 14-gauge cables and to a power plug by three (3) 18-gauge cables. The master controller 500 may be further connected to the auxiliary controllers 305 via ten (10) 18-gauge cables that connect the master controller 500 to the connection box 590, and to the rotational positioning mechanisms 428 via five (5) 14-gauge cables that connect the master controller 500 to the connection box. The connection box 590 appropriately interconnects the cables of the master controller 500 with the cables of the auxiliary controllers 305 and the rotational positioning mechanisms 428 and thus provides a central location for interconnecting such components.

FIG. 59 depicts additional details regarding an embodiment of the master controller 500. As depicted, the master controller 500 in one embodiment comprises a processor 540, a memory 542, one or more I/O interfaces 544, and a real time clock 546. The processor 540 generally manages the other components of the master controller 500. To this end, the processor 540 in one embodiment comprises embedded firmware which the processor 540 executes to perform various tasks. The processor 540 may be implemented using a general purpose processor, a digital signal processor, or a microcontroller which are available from numerous manufactures such as Intel Corporation, Advanced Micro Device, International Business Machines, Texas Instruments, or the like. In one embodiment, the processor 540 comprises either TMS320LF2407 or TMS320F2806 digital signal processor marketed by Texas Instruments though other processors may be used.

The memory 542 stores data for the master controller 500. In particular, the processor 540 may read data from the memory 542 and write data to the memory 542. In one embodiment, the memory 542 comprises a removable memory card having a capacity of at least 512 kilobytes. In such an embodiment, the memory card may be removed in order to archive its stored data for future reference and/or may be removed for analysis by another computing device.

The one or more I/O interfaces 544 provide the processor 540 with interfaces for exchanging data with external devices such as the user interface 8, the auxiliary controllers 305, and the positioning mechanisms 510. In one embodiment, the auxiliary interface 544 comprises an RS-485 serial interface which couples the master controller 500 to the auxiliary controllers 305 in a daisy chain manner. The auxiliary interface 305 may further comprise other wired and/or wireless interface that may be used to operatively couple the user interface 8, the auxiliary controllers 305, and the positioning mechanisms 510 to the master controller 500. Such wired and/or wireless interfaces may include but are not limited to the following: RS-232, RS-422, RS-485 and Controller Area Network (CAN) serial interfaces; IEEE 802.3 (Ethernet) networking interfaces; IEEE 802.11 (WiFi) interfaces; Universal Serial Bus (USB) interfaces; IEEE 1394 (FireWire) interfaces; PS/2 mouse and keyboard interfaces; and IEEE 802.15.1 (Bluetooth) interfaces.

The real time clock 546 provides the processor 540 with a current time reference. The processor 540 may utilize the current time reference to time stamp data received from devices coupled to the I/O interfaces 544. The processor 540 may further utilize the real time clock 546 to synchronize operation of the master controller 500 with other components of the bulk material handling system. In one embodiment, the real time clock 546 comprises a M41T0M6 real time clock chip from ST Microelectronics.

FIG. 60 depicts additional details regarding an embodiment of auxiliary controllers 305. Each of the auxiliary controllers 305 in the depicted embodiment comprises a local power supply 550, one or more movement sensors 552, one or more temperature sensors 554, one or more signal interfaces 556, and a processor 558. The local power supply 550 receives power from the main supply block 520. The local power supply 550 conditions and/or transforms the power supplied by the main supply block 520 to provide components of the auxiliary controller 305 with appropriate power signals.

The movement sensors 552 are generally operable to detect movement of the auxiliary controller 305, the bulk material handling apparatus 4, the bulk material handling accessory 6, the bulk material, and/or a component of the apparatus 4 or the accessory 6. To this end, the movement sensor 552 may comprise sensors that detect changes in displacement, changes in velocity, changes in acceleration, and/or other indications of movement. In one embodiment, the movement sensor 552 comprise a plurality of accelerometers where one accelerometer measures acceleration of the arm 212 and another accelerometer measures gradient or tilt of the arm 212.

The accelerometers of one embodiment have a very small size, extended temperature range (operating range −55 . . . +125° C., with guaranteed specifications at least in the −40 . . . +100° C. range), and the capability of withstanding shocks of at least 2000 g. In particular, the accelerometers may comprise MEMS (Micro Electro Mechanical System) type which typically are very small size and are capable of generating gradient information with only a simple low pass filter. In one embodiment, the accelerometers for measuring acceleration comprise the ADXL78 accelerometer, and the accelerometers used for measuring the tilt comprise the ADXL322 accelerometer both made by Analog Devices. Furthermore, in one embodiment, the accelerometers are placed on the same printed circuit board as the processor 558 and near analog inputs of the processor 558. Furthermore, the accelerometers are placed away from pulse width modulation outputs of the processor 558 to reduce electric noise that may corrupt the accelerometers signal.

The temperature sensor 554 generates an analog measurement signal that is representative of temperature sensed by the temperature sensor 554. In an embodiment, the temperature sensor 554 has a measurement range of −40° C. to +125° C. Furthermore, the temperature sensor in one embodiment comprises an AD7416ARM temperature sensor from Analog Devices although other sensors may be used.

The signal interfaces 556 may receive measurement signals from the sensors 552, 554 and condition such signals such that they are in a form suitable for inputs of the processor 558. Assuming the sensors 552, 554 generate analog measurement signals that are to be supplied to analog inputs of the processor 558, the signal interface 556 may filter, amplify, attenuate or otherwise adjust such measurement signals such that conditioned measurement signals remain within an operating range of the analog inputs of the processor 558. Similarly, if the analog measurement signals are to be supplied to digital inputs of the processor 558, the signal interfaces 556 may filter, amplify, attenuate, digitize or otherwise adjust the measurement signals such that the digitized values of the measurement signals remain within an input range of the processor 558. Likewise, the signal interfaces 556 may condition control signals generated by the processor 558 such that such control signals remain within operating ranges of those components receiving the control signals. Again, such conditioning may encompass filtering, amplifying, attenuating, and/or digitizing such control signals.

The processor 558 receives the conditioned measurement signals from the sensors 552, 554 and provides an output control signal to its respective damper 304 via a signal interface 556. In one embodiment, the processor 558 comprises either TMS320LF2401 or TMS320F2801 digital signal processor from Texas Instruments although other digital signal processors, general purpose processors, and/or microcontrollers may be used. The processor 558 in one embodiment comprises a data acquisition block 560, a digital filter 562, integrators 564, 566, a peak converter 568, an average converter 570, and root mean square (RMS) converter 572, a signal selector 576, a proportional-integral-derivative (PID) controller 578, and a pulse width modulation (PWM) controller 578. One skilled in the art should appreciate that many of the functional components of the processor 558 may be implemented as specialized hardware circuitry and/or software executed by general purpose circuitry.

The data acquisition block 560 receives conditioned measurement signals from the sensors 552, 554 via the signal interfaces 556 and converts such analog signals into digital samples that are representative of the received signals. In one embodiment, the data acquisition block 552, 554 receives measurement signals from two accelerometers 552 and thus generates two digitized signals therefrom. One digitized signal is representative of acceleration of the arm 212 and the other digitized signal is representative of the tilt or gradient of the arm 212.

The digital filter 562 receives the digital signals from the data acquisition block 560 and further filters the digital signal to remove the noise and limit the digital signal to an particular bandwidth. In one embodiment, the digital filter 562 is implemented with a low group delay that is relatively constant within the operational bandwidth of 0 to 250 Hz. In particular, one embodiment of the digital filter 562 is implemented using a Remez exchange algorithm technique in order to reduce control error resulting from delay introduced by the digital filter 562 and other components of the auxiliary controller 305. In one embodiment, the maximum delay in the processing chain including the filter 562 is 13.7 us in order to maintain control error introduced by control delay at an acceptable level.

The first integrator 564 in one embodiment receives a digital signal from the digital filter 562 that is representative of acceleration of the arm 212 and integrates the signal to obtain a digital signal that is representative of velocity of the arm 212. Similarly, the second integrator 566 in one embodiment receives a digital signal from the first integrator 564 that is representative of velocity and integrates the signal to obtain a digital signal that is representative of displacement of the arm 212. The peak converter 568, average converter 570, and the RMS converter 572 each receives the digital signals from the digital filter 562 and the integrators 564, 566 and generates output signals that respectively represent the peak values, average values and RMS values of the received signals during an analysis period. In one embodiment, the analysis period is set to 0.5 seconds. However, the peak converter 568, average converter 570 and RMS converter 572 in one embodiment may be programmed with an analysis period between the range of 50 microseconds to over 3 seconds.

The signal selector 574 receives the digital signals from the digital filter 562, the integrators 564, 566 and the converters 568. 570, 572 and selects signals of interest for the PID controller 576. In one embodiment, the signal selector 574 represents a function implemented by software that allows other software components of the auxiliary controller 305 to select signals for a control algorithm.

The PID controller 576 receives selected signals from the signal selector and generates a digital control signal based thereupon. In one embodiment, the PID controller 576 processes the selected signals based upon a control algorithm designed to control the bulk material handling accessory 6 in a desired manner. As will be explained below, the PID controller 576 in one embodiment generates the control signal based upon a damping control algorithm that attempts to maintain the scraper blades 214 of arms 212 in contact with belt surface 84 with an appropriate contact force which reduces chatter and scraper blade induced damage to the belt 82.

The PWM controller 578 receives the digital control signal and converts the digital control signal to an analog control signal. In particular, the PWM controller 578 generates the analog control signal with a pulse having a width that is proportional to the value of the digital control signal.

Damping Control

As mentioned above, the auxiliary controllers 305 control the dampening effect of the controlled dampers 304. In particular, the auxiliary controller 305 in one embodiment generates a control signal for its damper 304 based upon measurement signals that are indicative of acceleration of the arm 212. More specifically, the auxiliary controller 305 generates the control signal based upon a control algorithm that attempts to maintain proper cleaning pressure between the cleaning mechanism 86 and the conveyor belt 82, to reduce effects of shocks induced by large belt defects, and to reduce wearing effects on the belt 82, cleaning mechanism 86, and other mechanical components.

During operation of the belt cleaning mechanism 86, the belt cleaner arm 212 does not precisely follow the shape of the conveyor belt 82 due the inability of the belt cleaning mechanism 86 to react instantly to changes in the conveyor belt 82. Despite manufacturing intent, the surface 84 of the conveyor belt 82 is not completely even. The unevenness of the belt 82 results in the distance between the tips 260 of the scraper blades 214 and the belt 82 changing since belt cleaning mechanism 86 is unable to react instantly to such changes in the belt 82. The distance between the tips 260 and the belt surface 84 is further influenced by belt sag, major belt defects, and friction. Belt sags tend to induce relatively slow motion (e.g. several Hz) of belt surface 84 and the tips 260. However, major belt defects commonly induce fast motion (e.g. tens or hundreds of Hz) of the tips 260 as a result of the tips striking the major belt defects. Further, even without major belt defects, friction between the tips 260 and the belt surface 84 results in the tips 260 being pushed away from the surface 84.

The controlled dampers 304 have a dampening effect which may be represented by a damping coefficient c. In one embodiment, the damping coefficient c is linear with respect to the current of the control signal applied to the controlled dampers 304. Software of the auxiliary controllers 305 causes the processors 558 to select via the signal selector 574 from available status signals such as displacement signals, velocity signals, acceleration signals, peak signals, average signals, and RMS signals and determine the current of the control signal to apply to the dampers 304 in order to obtain a desired damping.

The status signal used by the auxiliary controllers 305 to control the dampers 304 may be one or more of the status signals applied to the signal selector 574. In the one embodiment, the auxiliary controllers 305 generate the control signals based upon the derived displacement signals. However, those skilled in the art should appreciate that one or more of the other status signals may be useful for other bulk material handling apparatus 6 or other embodiments of the belt cleaner apparatus 80. Further, it should be appreciated that since displacement signal in the present embodiment is calculated or derived from the acceleration signal, the displacement signal may not correspond to the actual displacement but rather a value proportional to the actual displacement.

Through mathematical analysis and extensive experimentation it has been determined that appropriate results are achieved when the control signal and the status signal exhibit the relationship depicted in FIGS. 61-64. One skilled in the art will recognize that other shapes or profiles are possible.

As shown in the examples in FIGS. 61-64, the damping, as reflected by the control signal C, is dependent upon the status signal. The control signal C has a minimum value $C_1$ that corresponds to the minimum damping for a fail-safe feature.

The control signal C also has a maximum value $C_2$ that corresponds to the maximum damping for a safe and stable system. The minimum value $C_1$ and the maximum value $C_2$ may be determined from datasheets of the dampers 304 and analysis of the bulk material handling system.

FIGS. 61-64 further depict system parameters $S_1$, $S_2$, $S_3$, and $S_4$. The system parameters $S_1$, $S_2$, $S_3$, and $S_4$ correspond to values of the status signal such as acceleration, velocity, or displacement. In one embodiment, the auxiliary controller 305 controls the damping based upon a displacement status signal and as such the system parameters $S_1$, $S_2$, $S_3$, and $S_4$ correspond to various displacement values. As depicted, the displacement is plotted against the x axis whereas the current of the control signal is plotted against the y axis. As such, the 0 location on the x axis in one embodiment corresponds to the belt cleaner mechanism 86 being in an initial position with the scrapper blades 214 engaged with the belt surface 84. Further, positive displacement values correspond to the belt 82 pushing the scrapper blades 214 away thus resulting in mechanical energy being transferred from the belt 82 to the cleaner arm 212. Conversely, negative displacement values correspond to the belt 82 returning to its initial position and the belt cleaner arm 212 releasing the mechanical energy through the dampers 304, friction, etc. By changing the system parameters, $S_1$, $S_2$, $S_3$, and $S_4$, various levels of cleaning efficiency, blade wearing, and arm/frame vibrations may be achieved.

In a practical installation, a technician sets the system parameters $S_1$, $S_2$, $S_3$, and $S_4$ based on experience, system physical size, belt characteristics, and conveyed material characteristics. A technician may analyze the system behavior and change the coefficients $S_1$, $S_2$, $S_3$, and $S_4$ in such a way as to improve the parameters that are the most important for that particular application at that time. For example, because of heavy rains, conveyed material may become wet and sticky. Therefore the technician may decide to temporarily increase the pressure exerted by the scraper blades 212 against the belt surface 84. To achieve this goal, the technician may increase the minimum value $C_1$ thus increasing the minimum value of the control signal.

Additionally, the control signal plots need not be symmetrical. In some instances, asymmetrical control signal patterns may prove to be useful. The reason for this behavior is that if the right side has a more shallow slope then the mechanical energy absorbed from the external force is lower since the coupling factor is lower. If the left side has a steeper slope the mechanical energy dispersed to the environment is higher since the coupling factor is higher. In one embodiment, the manufacturer and later on the technician may choose the control parameters $C_1$, $C_2$, $S_1$, $S_2$, $S_3$, $S_4$ with the goal of reducing the spectral components in the displacement error. By transferring a signal from the time domain to the frequency domain (Fourier Transform) the energy content is preserved. This is a direct consequence of the Wiener Khintchine theorem (the power spectral density of a wide-sense-stationary random process is the Fourier Transform of the corresponding autocorrelation function). Therefore by analyzing the displacement error spectrum in the frequency domain, it is possible to select parameters that reduce the error. To permit this selection of parameters, the bulk material handling controller 12 may collect data and may execute the configuration algorithm described below to determine the control parameters for reduced displacement error.

Configuration of Damping Control

Figure 65:
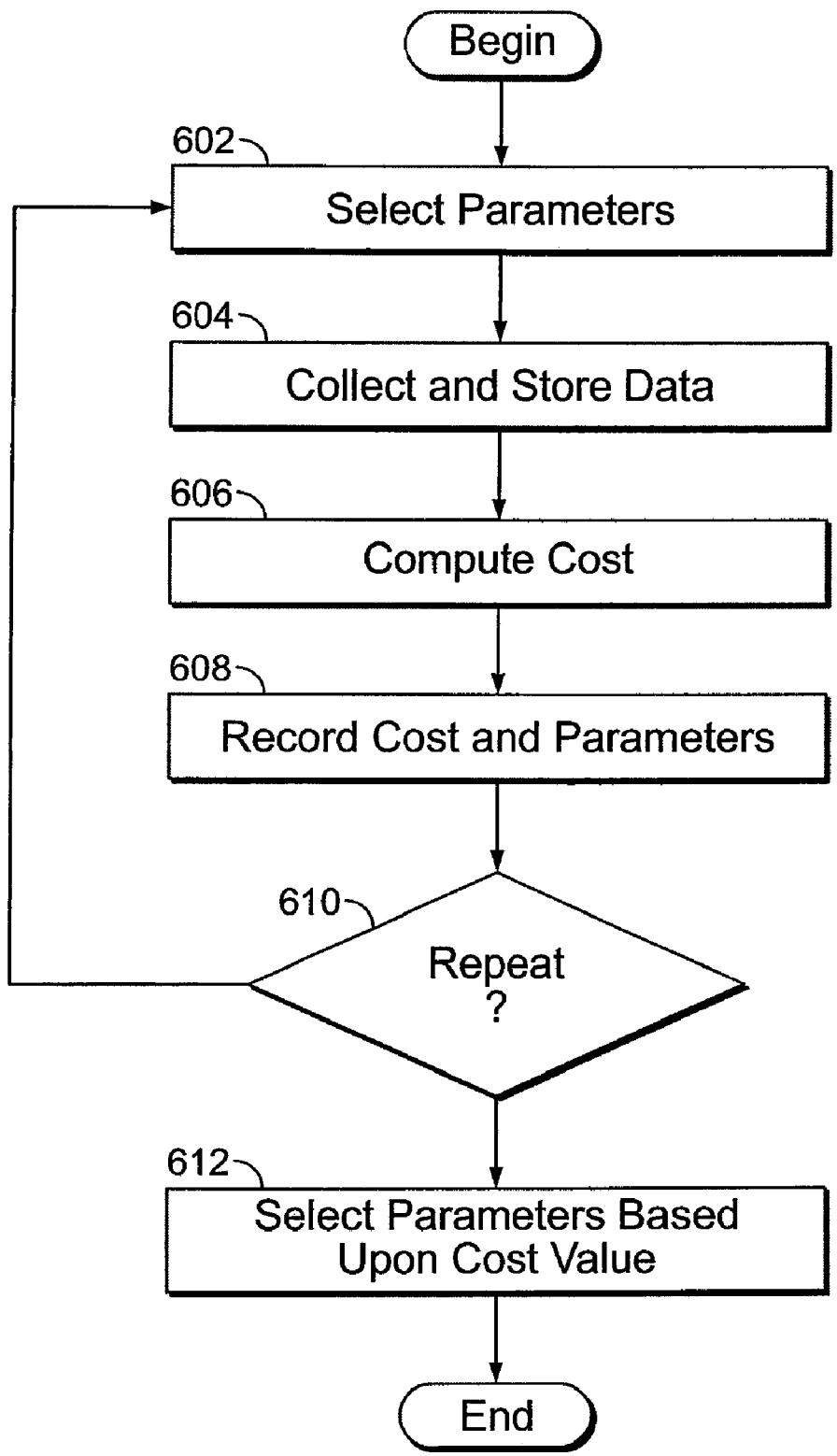
FIG. 65 is a flowchart of an embodiment of a method of configuring system parameters of the control signal patterns depicted in FIGS. 61-64.

FIG. 65 depicts a method used by each of the auxiliary controllers 305 to configure system parameters $C_1$, $C_2$, $S_1$, $S_2$, $S_3$, and $S_4$ that are used to generate control signals. In block 602, the auxiliary controller 305 selects a first set of values for the system parameters $C_1$, $C_2$, $S_1$, $S_2$, $S_3$, and $S_4$. For example, the auxiliary controller 305 may select the system parameters as follows: $S_1 = -2$ mm, $S_2 = -1$ mm, $S_3 = 0$ mm, $S_4 = 5$ mm, $C_1 = C_{min}$, $C_2 = C_{max}$. In block 604, the auxiliary controller 305 configures the auxiliary controllers 305 with the selected parameters and collects data regarding the status signals from the auxiliary controllers 305 for a configuration cycle. In one embodiment, the auxiliary controller 305 records the displacement error x(t) over the configuration cycle. Further, the configuration cycle in one embodiment is defined as 1.5 seconds which is large enough to include at least one full period of the excitation caused by sag of the belt 82. For one embodiment of the conveyor belt cleaner 80, belt sag is the excitation with the largest period. Other excitations such as friction or belt defect typically have a shorter period. However, it should be appreciated that for other embodiments of the conveyor belt cleaner 80 or for other bulk material accessories 6 a different configuration period may be selected which accounts for the largest excitation period of interest.

The auxiliary controller 305 in block 606 calculates a cost value from the collected data which provides a measure of the effectiveness of the bulk material handling controller 12 when operating based upon the selected system parameters $C_1$, $C_2$, $S_1$, $S_2$, $S_3$, and $S_4$. In one embodiment, the auxiliary controller 305 for each displacement error x(t) computes its discrete Fast Fourier Transform (FFT) $f_x[i]$ where i is the harmonic order. Then, the auxiliary controller 305 computes for each $f_x(i)$ set the cost function defined as the root means square contribution:

$$R_x = \sqrt{\frac{\sum_{i=0}^{n} f_x[i]}{n}},$$

where n represents the number of relevant harmonics found in $f_x[i]$. In one embodiment, the number of relevant harmonics is 55 times the excitation frequency. However, for ease of calculation in a small embedded system n=64 being the smallest power of 2 that is larger than 55.

In one embodiment, the auxiliary controller 305 attempts to select the system parameters $C_1$, $C_2$, $S_1$, $S_2$, $S_3$, and $S_4$ such that overall displacement error is reduced in order to maintain the scraper blades 214 appropriately biased against the surface 84 of the conveyor belt 82. However, it is possible to design other configuration methods that attempt to reduce the response time or the overshoot, thus configuring the auxiliary controllers 305 to account for other aspects that may be more important to operation of certain types of bulk material handling accessories 6. For example, if the goal of the configuration method is to reduce the overshoot, the cost function may be replaced with a new cost function defined as:

$$R_x = \max(|x[i]|)_{i=0 \ldots n},$$

where max( ) is a function extracting the maximum from the list of absolute values of the displacement error x.

The auxiliary controller 305 then records in block 608 the calculated cost value and associated set of selected parameters $C_1$, $C_2$, $S_1$, $S_2$, $S_3$, and $S_4$. The auxiliary controller 305 then in block 610 decides whether to perform another configuration cycle. In one embodiment, the auxiliary controller 305 iterates through possible values for the system parameters $C_1$, $C_2$, $S_1$, $S_2$, $S_3$, and $S_4$ and elects to repeat another configuration cycle if further possible values remain. In another embodiment, the auxiliary controller 305 iterates through possible values until either a specified cost value is satisfied or until all values have been tested. For example, the auxiliary controller 305 may be configured to stop once a set of parameters results in an error (cost) below a defined threshold amount.

In block 612, the auxiliary controller 305 selects a set of parameters $C_1$, $C_2$, $S_1$, $S_2$, $S_3$, and $S_4$ based upon their associated cost values $R_x[i]$. In one embodiment, the auxiliary controller 305 attempts to minimize the cost or displacement error x(t) and as such selects the set of parameters $C_1$, $C_2$, $S_1$, $S_2$, $S_3$, and $S_4$ associated with the smallest cost $R_x[i]$. However, it should be appreciated that for other cost functions or other embodiments the auxiliary controller 305 may attempt to maximize the cost value for some aspect of the bulk material handling accessory 6. In such an embodiment, the auxiliary controller 305 then may select the set of parameters $C_1$, $C_2$, $S_1$, $S_2$, $S_3$, and $S_4$ associated with the largest cost value.

While the auxiliary controllers 305 may execute the method of FIG. 65 in order to initially set system parameters $C_1$, $C_2$, $S_1$, $S_2$, $S_3$, and $S_4$, the auxiliary controller 305 may also execute the method in response to other events. For example, a technician may request the auxiliary controllers 305 to execute the configuration method when operating conditions change. For example, a technician may request the auxiliary controllers 305 to execute the configuration method in response to a new conveyor belt, new conveyed material, change in speed, change in humidity, etc. Moreover, the auxiliary controller 305 may periodically slightly change the control parameters $C_1$, $C_2$, $S_1$, $S_2$, $S_3$, and $S_4$ to check if a new control set of parameters provides better results.

By running the configuration method in a simulation environment such as the SciLab, Octave, or Matlab, it has been determined that for the mechanical parameters used in the simulations, the control parameters of $C_2=C_{max}$, $C_1=C_{min}$, $S_1=S_2=-1$ mm, $S_3=5$ mm, $S_4=10$ mm provide appropriate results for one embodiment of the belt cleaner 80. As a result, these values are used as a default control set in one embodiment.

Safety Management

Figure 66:
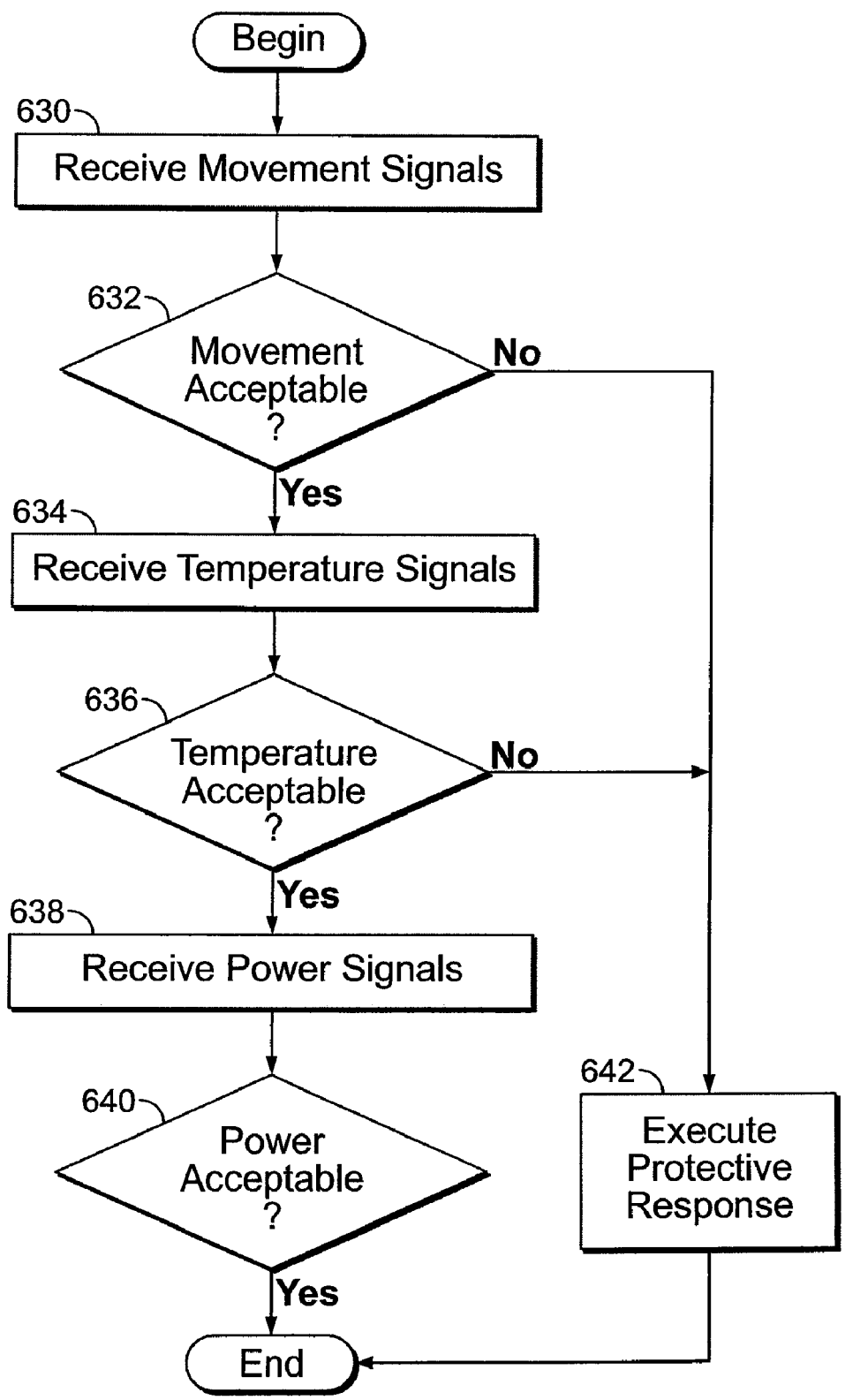
FIG. 66 depicts a flowchart of an embodiment of a safety response method suitable for a bulk material handling accessory such as a conveyor belt cleaner.

A safety management method which may be executed by the master controller 500 is depicted in FIG. 66. While FIG. 66 depicts the method as a sequential series of steps, those skilled in the art should appreciate that some embodiments may execute the steps in a different order and may execute certain steps in a parallel or pseudo-parallel fashion. In block 630, the master controller 500 receives movement signals from the auxiliary controllers 305 that represent movement characteristics of the arm 212. For example, the master controller 500 may receive from the auxiliary controllers 305 one or more of the acceleration, velocity, displacement, peak, average, and/or RMS status signals.

The master controller 500 then in block 632 may determine whether the movement of the arm 212 is acceptable or whether some protective action is to be taken in order to maintain safety. The following description is in regard to making a determination based upon received acceleration status signals. However, it should be appreciated that a similar scheme may be used to make such a determination based upon velocity, displacement, peak, average and/or RMS status signals. In one embodiment, the master controller 500 basically defines three protection zones. An upper zone corresponds to acceleration values that are greater than a programmed upper threshold $a_{max}$. A lower zone corresponds to acceleration values that are lower than a programmed lower threshold $a_{min}$. A middle zone corresponds to acceleration values that fall between the upper threshold $a_{max}$ and the lower threshold $a_{min}$. If the acceleration status signal indicates acceleration in the upper zone, then the master controller 500 determines to take protective action and proceeds to block 642 in order to take such action. Conversely, if the acceleration status signal indicates acceleration in the lower zone, then the master controller 500 determines not to take protective action and proceeds to block 634 in order to determine whether to take protective action based upon a temperature status signal.

For accelerations that fall in the middle protection zone, the master controller 500 triggers protective action in a delayed manner with a delay defined as:

$$t = k_t \cdot e^{-\alpha \cdot k_c},$$

where $\alpha$ represents the instantaneous acceleration, and $k_t$ and $k_c$ are predetermined coefficients. In one embodiment, the upper threshold, lower threshold, and coefficients are defined as: $a_{max}=500$ m/s$^2$; $a_{min}=250$ m/s$^2$; $k_t=10000$; and $k_c=\frac{1}{32}$. By delaying response for accelerations falling in the middle zone, the master controller 500 permits the bulk material handling accessory 6 to have short time periods of accelerations in the middle zone, but triggers protective action if accelerations above the lower threshold remain for an extended period of time.

In addition to the above three protection zones, a technician may use the user interface 8 to define limits regarding differences in acceleration, velocity, and displacement between adjacent arms 212 of the belt cleaner 80. If the master controller 500 determines that movement of adjacent arms 212 differs by an amount that exceeds the thresholds set by the technician, then the master controller 500 may determine to proceed to block 642 to take protective action. One reason the arms 212 may experience different movement is that the cleaner mechanism 86 may not be properly mounted thus resulting in the arms 212 not being properly aligned to the conveyor belt 82. Another reason is that the belt 82 may have been damaged locally resulting in one auxiliary controller 305 sustaining significantly higher shocks. Regardless of the cause, substantial differences in movement between the arms 212 is an indication of potentially unsafe operation of the belt cleaner 80, thus prompting the master controller 500 to take action.

If the movement is acceptable, then the master controller 500 in block 634 may receive temperature status signals from the auxiliary controllers 305 and may determine in block 636 whether the temperature reported by the received status signals is acceptable. In one embodiment, if the temperature reported by an auxiliary controller 305 leaves a specified range, the master controller 500 determines to proceed to block 642 to take protective action. A technician in one embodiment may use the user interface 8 to set the temperature limit according to the conveyor belt material, conveyed material, regulations, and other environment conditions. For example in potentially explosive environments, the temperature limit may be dictated by the flammability of that particular environment.

In block 638, the master controller 500 may receive status signals from the master supply block 520 and the local power supplies 550 regarding the power supply capabilities of the respective units. The master controller 500 in block 640 may determine based upon the received status signals for the power supplies whether to take protective action. In one embodiment, the master controller 500 proceeds to block 642 to take protective action if any local power supply 550 is not fully functional or the master supply block 520 fluctuates outside of some safe limits.

In block 642, the master controller 500 takes protective action. In one embodiment, the master controller 500 generates control signals which cause the positioning mechanisms 530 to retract the cleaner mechanism 86 with all arms 212 away from the belt 82. Further, the master controller 500 may inform a technician via the user interface 8 regarding the protective action taken and/or the cause of the protective action.

In addition to the above protective measures, the conveyor belt cleaner 80 in one embodiment comprises further protective features. In particular, the dampers 304 of the belt cleaner arms 212 in one embodiment are pre-biased at the minimum damping value $C_1$. As a result, if bulk material handling controller 12 fails, the damping automatically switches to a low and safe value and stays that way until the maintenance technician restores the fully operational state. Further, pre-biasing protects the dampers 304 as such devices may be destroyed by large swings if the damper coil is left without power supply.

Activity Monitoring & Functional Data Storage (AM&FDS)

The main controller 500 in one embodiment interrogates each auxiliary controller 305 in order to obtain movement, temperature and other status data therefrom. In one embodiment, the main controller 500 periodically interrogates the auxiliary controllers 305 for such data. In another embodiment, instead of interrogating each of the auxiliary controllers 305, the auxiliary controllers 305 periodically send the master controller 500 collected status information. Regardless of how the master controller 500 obtains the data from the auxiliary controllers 305, the master controller 500 in one embodiment maintains an activity log that includes the operational values of each arm 212, time stamps such values and corresponding parameters that have been used to operate the arms 212. The corresponding parameters include the measured and derived values as described above and other values like the range of safe operation for each safety feature.

The main controller 500 may store all this information in memory 542 and makes such data available to local or remote users via the user interface 8. When the local memory 542 is full, the main controller 500 may generally remove older data to make room for newer data. However, certain data which is deemed more important such as, for example, user commands received via the user interface 8 may be kept for longer periods for legal and safety reasons.

As previously described, each auxiliary controller 305 in one embodiment has the capability of measuring or estimating through computations the following real-time values: acceleration, velocity, displacement, arm inclination (tilt), and temperature. Further, each auxiliary controller 305 is capable to compute for each measured sample of acceleration, velocity, and displacement the following values: average, peak, root mean square value. These values can be used by the master controller 500 to monitor system activity and make adjustments to the components.

The master controller 500 for example may determine the working status of each arm 212 based upon the arm inclination. In particular, the master controller 500 may interrogate each auxiliary controller 305 on a regular basis. Therefore, the master controller 500 may maintain a log of arm inclination data for each arm 212. The master controller 500 may maintain the logs such that the first arm inclination entry for each arm 212 corresponds to an arm inclination reference at the time of installation. The master controller 500 may then use the arm inclination data to measure wear of the belt 82 since as the belt 82 wears the angle or inclination of the arms 212 changes.

Figure 67:
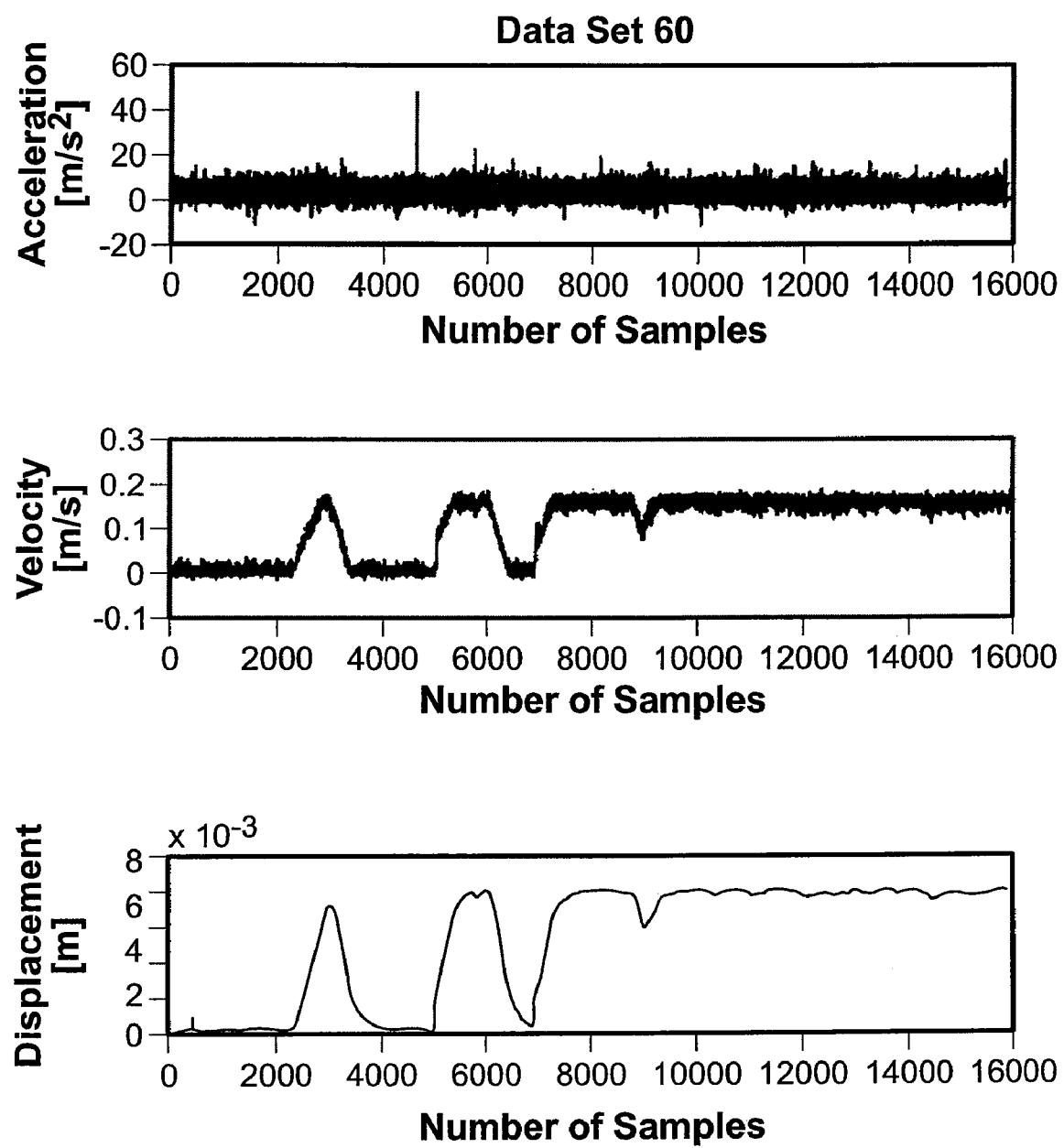
FIG. 67 depicts a graph showing bulk material loading effects on arm displacement of a belt cleaner.

The master controller 500 may further monitor belt loading and/or the composition of the conveyed material based upon status signals received from the auxiliary controllers 305. In particular, the master controller 500 may monitor the displacement of each arm 212 and determine the loading of the belt 82 based upon variation of the displacement. As shown in FIG. 67, displacement of the arms 212 is indicative of the loading on the belt 82. As it could be seen from FIG. 67, the initial displacement is near zero indicating an empty conveyor belt. Later on, the displacement shows increased values indicating various degrees of loading. Moreover, the master controller 500 may utilize this technique of monitoring the displacement of the arms 212 as an indication of the belt clogging.

Various features of the invention have been particularly shown and described in connection with the illustrated embodiment of the invention, however, it must be understood that these particular arrangements merely illustrate, and that the invention is to be given its fullest interpretation.

What is claimed is:

1. A method of dampening vibration of a scraper blade of a bulk material handling accessory with respect to a conveyor belt, said method comprising the steps of:

providing a damper having a piston and a housing including a fluid chamber, said piston including a piston head located within said fluid chamber and a shaft extending outwardly from said housing and adapted to be coupled to the scraper blade, said piston head separating said fluid chamber into first and second sub-chambers located on respective sides of said piston head, said piston head forming one or more fluid passages extending between said first and second sub-chambers such that fluid within said fluid chamber may flow between said first and second sub-chambers through said fluid passages in response to movement of said piston head within said fluid chamber and with respect to said housing, said fluid having a viscosity;

changing said viscosity of said fluid in said fluid chamber to modify the damping characteristics of said damper in response to changes in the operating conditions of the scraper blade.

2. The method of claim 1 wherein said piston head includes an electric coil adapted to generate a magnetic field, said method including the step of changing the magnetic field generated by said electric coil to change the viscosity of the fluid.

3. The method of claim 1 including the step of providing a magnetic field to the fluid in the fluid chamber, and selectively changing the magnetic field to change the viscosity of the fluid.

4. The method of claim 1 including the step of providing an electric field to the fluid in the fluid chamber, and selectively changing the electric field to change the viscosity of the fluid.

5. The method of claim 1 including the step of transferring kinetic energy generated by vibration of the scraper blade to said piston of said damper, transferring kinetic energy from said piston to said fluid in said fluid chamber and converting the kinetic energy transferred to said fluid into heat, and transferring the heat to the atmosphere.

* * * * *